United States Patent
Militello et al.

(10) Patent No.: US 12,441,951 B2
(45) Date of Patent: Oct. 14, 2025

(54) POLYACRYLIC ACID CONTAINING LUBRICIOUS COATINGS FOR MEDICAL DEVICES WITH ENHANCED PROPERTIES

(71) Applicant: Surmodics, Inc., Eden Prairie, MN (US)

(72) Inventors: Michael Militello, Eden Prairie, MN (US); Syed Hossainy, Hayward, CA (US); David E. Babcock, Brooklyn Park, MN (US)

(73) Assignee: Surmodics, Inc., Eden Prairie, MN (US)

( * ) Notice: Subject to any disclaimer, the term of this patent is extended or adjusted under 35 U.S.C. 154(b) by 62 days.

(21) Appl. No.: 18/388,652

(22) Filed: Nov. 10, 2023

(65) Prior Publication Data

US 2024/0240098 A1    Jul. 18, 2024

Related U.S. Application Data

(60) Provisional application No. 63/424,321, filed on Nov. 10, 2022.

(51) Int. Cl.
*C10M 107/42* (2006.01)
*A61L 29/04* (2006.01)
(Continued)

(52) U.S. Cl.
CPC ......... *C10M 107/42* (2013.01); *A61L 29/049* (2013.01); *A61L 29/085* (2013.01);
(Continued)

(58) Field of Classification Search
CPC .......... C10M 107/42; C10M 107/28; C10M 137/06; C10M 169/04; C10M 2209/0845;
(Continued)

(56) References Cited

U.S. PATENT DOCUMENTS 5,091,205 A    2/1992   Fan
5,414,075 A    5/1995   Swan et al.
(Continued)

FOREIGN PATENT DOCUMENTS

| CN | 120500358 | 8/2025 |
| EP | 1858438 | 3/2019 |
| MX | 2025005516 | 8/2025 |
| WO | 2024102465 | 5/2024 |

OTHER PUBLICATIONS

"International Search Report and Written Opinion," for PCT Patent Application No. PCT/US2023/037136 (our file 1001.649WOU1) mailed Mar. 12, 2024 (13 pages).

*Primary Examiner* — Taiwo Oladapo
(74) *Attorney, Agent, or Firm* — Pauly, DeVries Smith & Deffner LLC

(57) ABSTRACT

Embodiments herein relate to polyacrylic acid containing lubricious coatings for medical devices. In an embodiment, a lubricious coated medical device is included having a substrate and a first layer disposed over the substrate. The first layer can include a photoreactive polyvinylpyrrolidone, a non-photoreactive polyvinylpyrrolidone, and a crosslinking compound. A second layer can be disposed over the first layer, the second layer can include a poly(acrylic acid), and a non-photoreactive polyvinylpyrrolidone. The non-photoreactive polyvinylpyrrolidone of the second layer forms a complex with the poly(acrylic acid) of the second layer. The non-photoreactive polyvinylpyrrolidone of the second layer has a concentration existing as a gradient through a thickness of the second layer with a lower concentration at an outer surface of the second layer than at an inner surface of the second layer. Other embodiments are also included herein.

20 Claims, 8 Drawing Sheets

(51) Int. Cl.
  *A61L 29/08* (2006.01)
  *C10M 107/28* (2006.01)
  *C10M 137/06* (2006.01)
  *C10M 169/04* (2006.01)
  *C10N 20/04* (2006.01)
  *C10N 40/00* (2006.01)
  *C10N 50/00* (2006.01)

(52) U.S. Cl.
  CPC ........ *C10M 107/28* (2013.01); *C10M 137/06* (2013.01); *C10M 169/04* (2013.01); *A61L 2400/10* (2013.01); *A61L 2420/02* (2013.01); *C10M 2209/0845* (2013.01); *C10M 2217/0285* (2013.01); *C10M 2223/042* (2013.01); *C10N 2020/04* (2013.01); *C10N 2040/50* (2020.05); *C10N 2050/023* (2020.05)

(58) Field of Classification Search
  CPC ..... C10M 2217/0285; C10M 2223/042; A61L 29/049; A61L 29/085; A61L 2400/10; A61L 2420/02; A61L 29/041; A61L 31/048; A61L 27/16; A61L 31/10; A61L 27/34; C10N 2020/04; C10N 2040/50; C10N 2050/023
  See application file for complete search history.

(56) References Cited

U.S. PATENT DOCUMENTS

| | | |
|---|---|---|
| 5,637,460 A | 6/1997 | Swan et al. |
| 5,714,360 A | 2/1998 | Swan et al. |
| 6,278,018 B1 | 8/2001 | Swan |
| 7,772,393 B2 | 8/2010 | Guire et al. |
| 8,105,666 B2 | 1/2012 | Finley |
| 8,632,877 B2 | 1/2014 | Opperman |
| 10,342,898 B2 | 7/2019 | Babcock |
| 10,980,918 B2 | 4/2021 | Babcock et al. |
| 11,000,632 B2 | 5/2021 | Babcock et al. |
| 11,278,647 B2 | 3/2022 | Militello |
| 2010/0198168 A1 | 8/2010 | Rooijmans |
| 2010/0274012 A1 | 10/2010 | Guire et al. |
| 2011/0046255 A1 | 2/2011 | Rooijmans |
| 2011/0059874 A1 | 3/2011 | Rooijmans et al. |
| 2011/0144373 A1 | 6/2011 | Swan et al. |
| 2011/0245367 A1 | 10/2011 | Kurdyumov et al. |
| 2012/0046384 A2 | 2/2012 | Kurdyumov et al. |
| 2012/0149934 A1 | 6/2012 | Kurdyumov |
| 2013/0143056 A1 | 6/2013 | Swan et al. |
| 2014/0193474 A1 | 7/2014 | Babcock et al. |
| 2019/0275209 A1 | 9/2019 | Babcock et al. |
| 2019/0330551 A1* | 10/2019 | Babcock ................. A61L 29/08 |

* cited by examiner

POLYACRYLIC ACID CONTAINING LUBRICIOUS COATINGS FOR MEDICAL DEVICES WITH ENHANCED PROPERTIES

This application claims the benefit of U.S. Provisional Application No. 63/424,321, filed Nov. 10, 2022, the content of which is herein incorporated by reference in its entirety.

FIELD

Embodiments herein relate to lubricious coatings. More specifically, embodiments herein relate to polyacrylic acid containing lubricious coatings for medical devices.

BACKGROUND

Medical devices include those that are chronically implanted, devices that are transitorily implanted, and those that not implanted at all. Many types of medical devices are enhanced by reducing the friction between the device and the environment that surrounds the medical device, particularly during insertion of a device. As an example, catheters are inserted, at least transitorily, into the body of a subject. Reduction of friction can lead to enhanced patient comfort, procedural ease for the care provider, reduced chances for infection, and reduced tissue disruption, amongst other benefits. One approach to reducing the friction between a medical device and the environment surrounding the medical device is to apply a lubricious coating onto the medical device.

SUMMARY

Embodiments herein relate to polyacrylic acid containing lubricious coatings for medical devices. In an embodiment, a lubricious coated coronary or peripheral vascular medical device is included having a substrate and a first layer, wherein the first layer is disposed over the substrate. The first layer can include a photoreactive polyvinylpyrrolidone, a first non-photoreactive polyvinylpyrrolidone, a second non-photoreactive polyvinylpyrrolidone different than the first, and a crosslinking compound. The coated device can also include a second layer, wherein the second layer is disposed over the first layer, the second layer can include a poly(acrylic acid) and a third non-photoreactive polyvinylpyrrolidone. Other embodiments are also included herein.

In an embodiment, a lubricious coated neuro microcatheter device is included herein having a substrate and a first layer, wherein the first layer is disposed over the substrate. The first layer can include a photoreactive polyvinylpyrrolidone, a first non-photoreactive polyvinylpyrrolidone, a second non-photoreactive polyvinylpyrrolidone different than the first, a third non-photoreactive polyvinylpyrrolidone different than the first and second, and a crosslinking compound. The lubricious coated neuro microcatheter device can also include a second layer, wherein the second layer is disposed over the first layer, the second layer can include a poly(acrylic acid), a photoreactive polyvinylpyrrolidone, a fourth non-photoreactive polyvinylpyrrolidone, a fifth non-photoreactive polyvinylpyrrolidone, and a cross-linking compound.

In an embodiment, a lubricious coated medical device is included having a substrate and a first layer disposed over the substrate. The first layer can include a photoreactive polyvinylpyrrolidone, a non-photoreactive polyvinylpyrrolidone, and a crosslinking compound. A second layer can be disposed over the first layer, the second layer can include a poly(acrylic acid), and a non-photoreactive polyvinylpyrrolidone. The non-photoreactive polyvinylpyrrolidone of the second layer forms a complex with the poly(acrylic acid) of the second layer. The non-photoreactive polyvinylpyrrolidone of the second layer has a concentration existing as a gradient through a thickness of the second layer with a lower concentration at an outer surface of the second layer than at an inner surface of the second layer.

In an embodiment, a method of making a polyacrylic acid containing coating for a medical device is included. The method can include applying a first coating composition to a substrate to form a first layer. The first coating composition can include a photoreactive polyvinylpyrrolidone, a non-photoreactive polyvinylpyrrolidone, and a cross-linking compound. The method can further include applying a second coating composition over the first layer to form a second layer. The second coating composition can include a poly(acrylic acid). The method can further include allowing the non-photoreactive polyvinylpyrrolidone to diffuse into the second layer from the first layer.

In an embodiment, a lubricious coated medical device is included having a substrate and a first layer disposed over the substrate. The first layer can include a photoreactive polyvinylpyrrolidone, a non-photoreactive polyvinylpyrrolidone, and a crosslinking compound. The coating can also include a second layer, wherein the second layer is disposed over the first layer. The second layer can include a poly(acrylic acid), and a second non-photoreactive polyvinylpyrrolidone. The second non-photoreactive polyvinylpyrrolidone can form a complex with the poly(acrylic acid).

In an embodiment, a method of making a polyacrylic acid containing coating for a medical device is included. The method can include applying a first coating composition to a substrate to form a first layer. The first coating composition can include a photoreactive polyvinylpyrrolidone, a first non-photoreactive polyvinylpyrrolidone, and a cross-linking compound. The method can include applying a second coating composition over the first layer to form a second layer. The second coating composition can include a poly(acrylic acid) and a second non-photoreactive polyvinylpyrrolidone. In some embodiments the second coating composition can have a pH of 4 to 5.

In an embodiment, a lubricious coated medical device is included having a substrate and a first layer. The first layer can include a photoreactive polyvinylpyrrolidone, a non-photoreactive polyvinylpyrrolidone, and a crosslinking compound. The coating can also include a second layer, the second layer including a poly(acrylic acid). The coating can also include a third layer, the third layer can include a second non-photoreactive polyvinylpyrrolidone.

In an embodiment, a method of making a polyacrylic acid containing coating for a medical device is included. The method can include applying a first coating composition to a substrate to form a first layer. The first coating composition can include a photoreactive polyvinylpyrrolidone, a non-photoreactive polyvinylpyrrolidone, and a cross-linking compound. The method can include applying a second coating composition over the first layer to form a second layer. The second coating composition can include a poly(acrylic acid). The method can include applying a third coating composition over the second layer to form a third layer. The third coating composition can include a second non-photoreactive polyvinylpyrrolidone. In some embodiments the third coating composition has a pH of 7 or lower.

In an embodiment, a lubricious coated medical device is included having a substrate and a first layer, wherein the first layer is disposed over the substrate. The first layer can include a photoreactive polyvinylpyrrolidone, a non-photoreactive polyvinylpyrrolidone, and a crosslinking compound. The coating can include a second layer disposed over the first layer. The second layer can include a poly(acrylic acid) and a polyvinylpyrrolidone composition. The polyvinylpyrrolidone composition can include a PVP copolymer. The PVP copolymer forms a complex with the poly(acrylic acid).

In an embodiment, a lubricious coated medical device is included having a substrate and a first layer. The first layer can include a photoreactive polyvinylpyrrolidone, a non-photoreactive polyvinylpyrrolidone, and a crosslinking compound. The coating can also include a second layer. The second layer can include a poly(acrylic acid). In some embodiments the second layer can have a pH of greater than 5.

In an embodiment, a lubricious coated medical device is included having a substrate and a first layer. The first layer can include a photoreactive polyvinylpyrrolidone, a non-photoreactive polyvinylpyrrolidone, and a crosslinking compound. The coating can include a second layer. The second layer can include a poly(acrylic acid) homopolymer and a poly(acrylic acid) copolymer.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
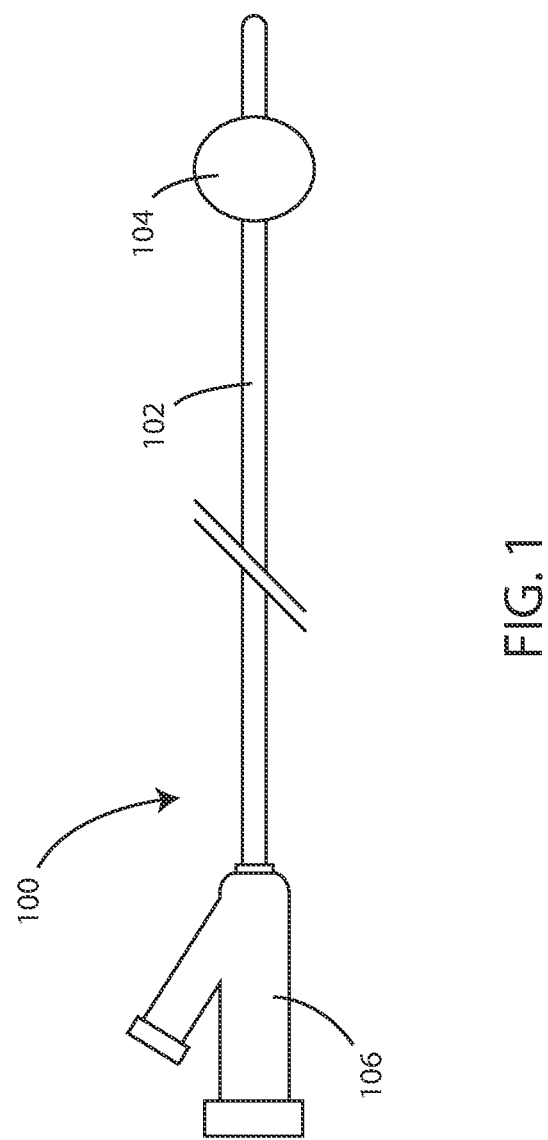
FIG. 1 is a schematic view of a coated medical device in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As described above, one approach to reducing the friction between a medical device and the environment surrounding the medical device is to apply a lubricious coating onto the medical device. However, many lubricious coatings do not reduce friction between the device and the environment surrounding the device as much as desired. Further, many lubricious coatings lack sufficient durability leading to a potential increase in friction during the course of use.

Polyacrylic acid (PAA) is a biocompatible hydrophilic polymer. However, polyacrylic acid contains exposed COOH groups and when lubricious coatings containing PAA and exposed COOH groups are sterilized using ethylene oxide (EO) based techniques, the ethylene oxide can react with the COOH groups forming polyethylene glycol (PEG) which functions to reduce the overall lubricity of the coating.

Embodiments herein include coatings, and specifically poly(acrylic acid) containing coatings, that are highly lubricious and exhibit good durability. Coatings herein can be sterilized using EO based techniques and yet exhibit substantially reduced or virtually no polyethylene glycol (PEG) formation.

In some embodiments, a non-photoreactive polyvinylpyrrolidone can be added to a layer (such as a top layer) of a coating that includes polyacrylic acid. While not intending to be bound by theory, the polyvinylpyrrolidone can hydrogen bond with the COOH groups of the polyacrylic acid chains and thereby prevent reaction with ethylene oxide and subsequent formation of polyethylene glycol. As an example, in various embodiments, a lubricious coated medical device is included herein having a substrate and a first layer disposed over the substrate. The first layer can include a photoreactive polyvinylpyrrolidone, a non-photoreactive polyvinylpyrrolidone, and a crosslinking compound. A second layer can be disposed over the first layer. The second layer can include a poly(acrylic acid) and a second non-photoreactive polyvinylpyrrolidone, wherein the second non-photoreactive polyvinylpyrrolidone forms a complex with the poly(acrylic acid) protecting the COOH groups of the polyacrylic acid.

As another example, in various embodiments, a lubricious coated medical device is included having a substrate and a first layer disposed over the substrate. The first layer can include a photoreactive polyvinylpyrrolidone, a non-photoreactive polyvinylpyrrolidone, and a crosslinking compound. A second layer can be disposed over the first layer and can include a poly(acrylic acid) and a polyvinylpyrrolidone composition. The polyvinylpyrrolidone composition can include a polyvinylpyrrolidone copolymer. The polyvinylpyrrolidone copolymer can form a complex with the poly(acrylic acid) protecting the COOH groups of the polyacrylic acid.

In some embodiments, a layer including non-photoreactive polyvinylpyrrolidone can be disposed over a layer including a polyacrylic acid and thereby protect the polyacrylic acid. As an example, in various embodiments, a lubricious coated medical device is included having a substrate and a first layer, the first layer including a photoreactive polyvinylpyrrolidone, a non-photoreactive polyvinylpyrrolidone, and a crosslinking compound. A second layer can be disposed over the first layer and can include a poly(acrylic acid). A third layer can be disposed over the second layer and can include a second non-photoreactive polyvinylpyrrolidone.

In some embodiments, the pH of the environment surrounding the polymer chains of PAA can be controlled (such as through the addition of a salt which could be, as an example, a PAA salt monomer). The pH controls the degree of protonation of groups such as the COOH groups. While not intending to be bound by theory, the raised pH environment acts to protect the exposed COOH groups on the polymer chains of PAA to prevent reaction of the COOH with ethylene oxide ($C_2H_4O$) and thereby prevent the formation of polyethylene glycol (PEG) which would otherwise function to reduce lubricity of the coating. That being said, partial protonation prevents components of a coating solution used to create the coating from precipitating out of solution. As one example of controlling the pH of the environment surrounding the polymer chains of PAA, in various embodiments a lubricious coated medical device is included having a substrate and a first layer wherein the first layer can include a photoreactive polyvinylpyrrolidone, a non-photoreactive polyvinylpyrrolidone, and a crosslinking compound. A second layer can be disposed over the first layer and can include a poly(acrylic acid). In some embodiments the second layer can have a pH of greater than 5.

In some embodiments, the COOH groups of the polyacrylic acid can be protected using poly(acrylic acid) copolymers. As an example of this approach, in various embodiments a lubricious coated medical device is included having a substrate and a first layer wherein the first layer can include a photoreactive polyvinylpyrrolidone, a non-photoreactive polyvinylpyrrolidone, and a crosslinking compound. A second layer can be disposed over the first layer, wherein the second layer can include a poly(acrylic acid) homopolymer, and a poly(acrylic acid) copolymer. Subunits of the poly(acrylic acid) copolymer (such as non-acrylic acid subunits) can interface with and protect the COOH groups of the polyacrylic acid, thereby preventing formation of polyethylene glycol (PEG) which would otherwise function to reduce lubricity of the coating.

Many different medical devices can be coated with lubricious coatings herein including, but not limited to, chronically implantable medical devices, transitorily implantable medical devices, and the like. Further examples of implantable medical devices are provided below. However, in various embodiments, catheters of various types and/or devices having long shafts can be coated.

Referring now to FIG. 1, a schematic view of a coated medical device 100 is shown in accordance with various embodiments herein. It will be appreciated that the coated medical device 100 of FIG. 1 is merely one example of a medical device can be coated with coatings described herein. In this example, the coated medical device 100 can include a catheter shaft 102, a balloon 104, and a connection manifold 106 (or proximal connector). The balloon 104 can be inflated and, in some embodiments, can also carry a drug-eluting coating. In various embodiments, the catheter shaft 102 can be coated with a lubricious coating herein. In some embodiments, the balloon 104 can be coated with a lubricious coating herein. In some embodiments, the catheter shaft 102 and the balloon 104 can be coated with a lubricious coating herein.

Figure 2:
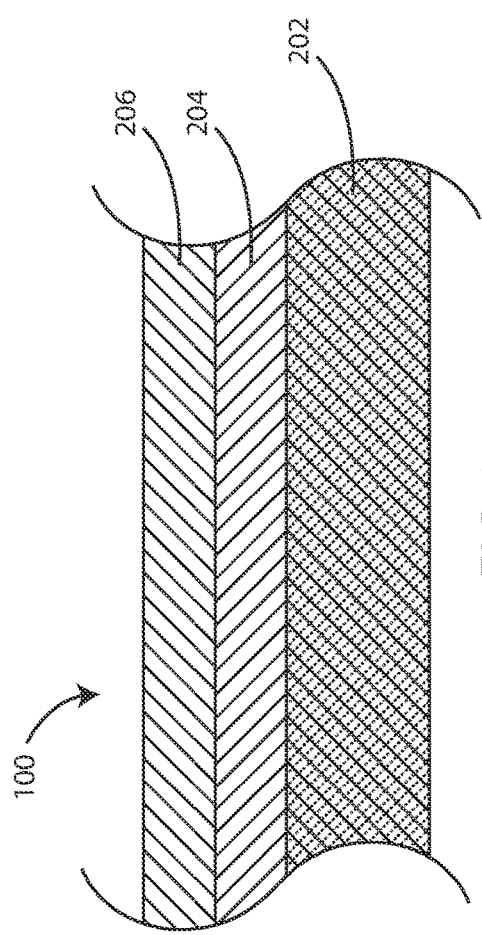
FIG. 2 is a cross-sectional view of a coating in accordance with various embodiments herein.

Referring now to FIG. 2, a cross-sectional view of a coating is shown in accordance with various embodiments herein. FIG. 2 shows a lubricious coated medical device 100. The lubricious coated medical device 100 includes a substrate 202. Example of substrates can include polymers, metals, ceramics, composites, and the like. In various embodiments, the substrate 202 can be at least one selected from the group consisting of a polymer and a metal. Further examples of substrates are provided below. In this example, the lubricious coated medical device 100 includes a first layer 204. The first layer 204 can be disposed over the substrate 202. In some embodiments, the first layer 204 can be disposed directly on the substrate 202. In some embodiments, an intermediate layer can be disposed between the first layer 204 and the substrate 202.

The lubricious coated medical device 100 also includes a second layer 206. The second layer 206 can be disposed over the first layer 204. In some embodiments, the second layer 206 can be disposed directly on the first layer 204. In some embodiments, an intermediate layer can be disposed between the first layer 204 and the second layer 206. The first layer 204 and the second layer 206 can be composed of the same materials and/or can be composed of different materials.

In some embodiments, the second layer 206 can be the outer most portion of the coating such that an outer surface of the second layer 206 can configured for direct contact with the in vivo environment into which the lubricious coated medical device 100 is inserted. However, in some embodiments a third layer (not shown in this view) can be disposed over the second layer 206.

The second layer 206 can be retained on the first layer 204 in various ways. For example, in some embodiments, the second layer 206 can be retained on the first layer 204 by hydrogen bonding and light crosslinking between the poly(acrylic acid) in the second layer 206 with unreacted active groups in the polymer chains of the first layer 204.

The thickness of the first layer 204 and second layer 206, together, can be from about 200 nm to about 6500 nm when dry. In some embodiments, the thickness of the two layers together can be from about 1500 nm to about 4000 nm. In some embodiments, the thickness of the two layers together can be from about 3000 nm to about 4000 nm. The thickness of the first layer 204 can make up the bulk of the combined first layer 204 and second layer 206 thickness. In some embodiments, the first layer 204 can be at least at least about 60, 70, 75, 80, 85, 90, or 95 percent of more of the overall thickness, or an amount falling within a range between any of the foregoing. In some embodiments the thickness of the first layer 204, when dry, can be in the range of about 100 nm to about 4000 nm, about 500 nm to about 4000 nm, or about 1000 nm to about 3500 nm. In some embodiments the thickness of the second layer 206, when dry, can be less than about 200, 150, 100, 75, or 50 nm, or an amount falling within a range between any of the foregoing.

In some embodiments herein, the thickness of the underlying coat or coats (e.g., the first layer 204 with respect to FIG. 2 or the first layer 304 and second layer 306 with respect to FIG. 3) can impact the lubricity of overall coating on the device, such as shown with respect to Example 4 herein. In some embodiments, the thickness range (dry) of the underlying coating layer or layers is from 2.0 µm dry to 6.5 µm dry. In some embodiments, the thickness range (dry) of the underlying coating layer or layers is from 2.4 µm dry to 6.5 µm dry. In some embodiments, the thickness of the underlying coating layer or layers (dry) is about 2.25 µm, 2.5 µm, 2.75 µm, 3.0 µm, 3.25 µm, 3.5 µm, 3.75 µm, 4.0 µm, 4.25 µm, 4.5 µm, 4.75 µm, 5.0 µm, 5.25 µm, 5.5 µm, 5.75 µm, 6.0 µm, 6.25 µm, 6.5 µm, or an amount falling within a range between any of the foregoing.

In some embodiments herein, the crosslink density of the underlying coat or coats (e.g., the first layer 204 with respect to FIG. 2 or the first layer 304 and second layer 306 with respect to FIG. 3) can impact the lubricity of overall coating on the device, such as shown with respect to Example 5 herein. Crosslink density can be characterized as µmols of benzoylbenzamido (BBA) groups (photoreactive groups used to form crosslinks) per µmol of total polymer used (theoretical basis—assuming 100% crosslink efficiency). In some embodiments, the crosslink density of the underlying coat or coats can be less than 120, 110, 100, 90, 80, 70, 60, 50, 40, 30, 20, 10, 5, 2, or 1 µmols BBA per µmol of total polymer used, or a value falling within a range between any of the foregoing.

The components within the first layer 204 and the second layer 206 can vary and can include various specific compounds herein. In various embodiments, the lubricious coated medical device 100 can include a substrate 202 and a first layer 204, wherein the first layer 204 can be disposed over the substrate 202. The first layer 204 can include a photoreactive polyvinylpyrrolidone, a non-photoreactive polyvinylpyrrolidone, and a crosslinking compound. The lubricious coated medical device 100 can also include a second layer 206, wherein the second layer 206 can be disposed over the first layer 204. The second layer 206 can include a poly(acrylic acid) and a second non-photoreactive polyvinylpyrrolidone, wherein the second non-photoreactive polyvinylpyrrolidone forms a complex with the poly(acrylic acid).

In various embodiments, the lubricious coated medical device 100 can include a substrate 202 and a first layer 204, wherein the first layer 204 is disposed over the substrate 202. The first layer 204 can include a photoreactive polyvinylpyrrolidone, a non-photoreactive polyvinylpyrrolidone, and a crosslinking compound. The lubricious coated medical device 100 can also include a second layer 206. The second layer 206 is disposed over the first layer 204. The second layer 206 can include a poly(acrylic acid); and a polyvinylpyrrolidone composition. The polyvinylpyrrolidone composition comprising a PVP copolymer. The PVP copolymer can form a complex with the poly(acrylic acid).

In various embodiments, the lubricious coated medical device 100 can include a substrate 202 and a first layer 204. The first layer 204 can include a photoreactive polyvinylpyrrolidone, a non-photoreactive polyvinylpyrrolidone, and a crosslinking compound. The lubricious coated medical device 100 can also include a second layer 206, the second layer 206 comprising a poly(acrylic acid). The second layer 206 can have a pH of greater than 3. The second layer 206 can have a pH of greater than 4. The second layer 206 can have a pH of greater than 5. In various embodiments, the second layer 206 has a pH of greater than 7. In various embodiments, the second layer 206 has a pH of greater than 9. In various embodiments, the second layer 206 has a pH from 5 to 12.

In various embodiments, the lubricious coated medical device 100 can include a substrate 202 and a first layer 204. The first layer 204 can include a photoreactive polyvinylpyrrolidone, a non-photoreactive polyvinylpyrrolidone, and a crosslinking compound. The lubricious coated medical device 100 can also include a second layer 206. The second layer 206 can include a poly(acrylic acid) homopolymer and a poly(acrylic acid) copolymer. In various embodiments, the second layer 206 comprises a weight ratio of a poly(acrylic acid) copolymer to a poly(acrylic acid) homopolymer of 100:1 to 20:80.

Figure 3:
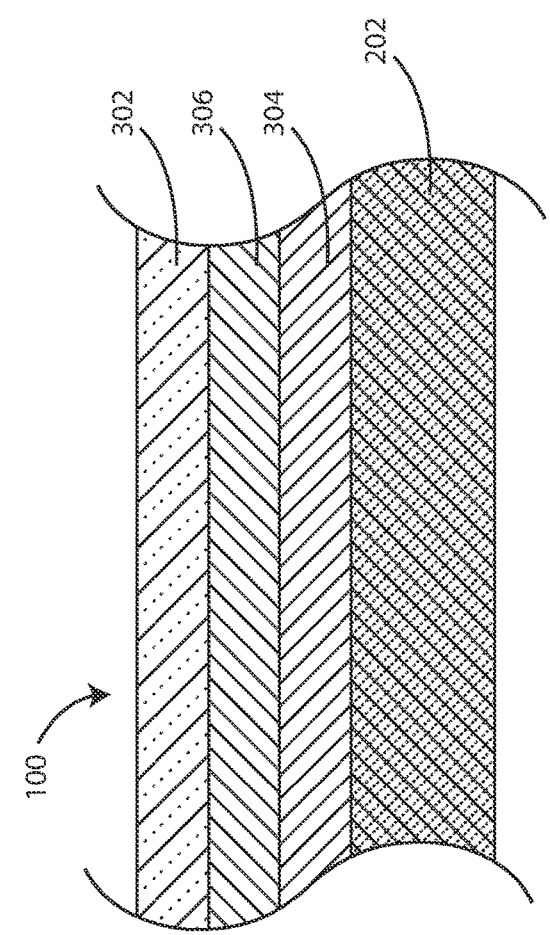
FIG. 3 is a cross-sectional view of a coating in accordance with various embodiments herein.

It will be appreciated that in various embodiments the lubricious coating can include more than two layers. For example, the lubricious coating can include one or more additional layers disposed over the layers described with respect to FIG. 2, one or more additional layers disposed under the layers described with respect to FIG. 2, and/or one or more additional layers disposed between the layers described with respect to FIG. 2. Referring now to FIG. 3, a cross-sectional view of a coating is shown in accordance with various embodiments herein. FIG. 3 shows a lubricious coated medical device 100. The lubricious coated medical device 100 includes a substrate 202. The lubricious coated medical device 100 also includes a first layer 304. The lubricious coated medical device 100 also includes a second layer 306. The lubricious coated medical device 100 also includes a third layer 302.

In various embodiments, a lubricious coated medical device 100 can include: a substrate 202, and a first layer 304, the first layer 304 can include a photoreactive polyvinylpyrrolidone, a non-photoreactive polyvinylpyrrolidone, and a crosslinking compound. The lubricious coated medical device 100 can also include a second layer 306, the second layer 306 can include a poly(acrylic acid). The lubricious coated medical device 100 can also include a third layer 302. The third layer 302 can include a second non-photoreactive polyvinylpyrrolidone.

In various embodiments, the second non-photoreactive polyvinylpyrrolidone of the third layer 302 can be complexed with the poly(acrylic acid) of the second layer 306 at the interface between the second layer 306 and the third layer 302 via hydrogen bonding. In various embodiments, the second layer 306 can be disposed directly on the first layer 304 and the third layer 302 can be disposed directly on the second layer 306.

In various embodiments, the third layer 302 has a thickness, when dry, of less than about 200, 150, 100, 75, or 50 nm, or an amount falling within a range between any of the foregoing.

In some embodiments, coating layers herein can be formed by applying a coating composition. For example, a first layer can be formed by applying a first coating composition and a second layer can be formed by applying a second coating composition. In some cases, the layers can be dried or otherwise cured prior to applying an overlying layer. However, in some cases, layers can be applied such that one or more components of an underlying layer can diffuse out into the newly applied layer. In this approach, the diffusion process results in a concentration gradient being formed with respect to the component that diffuses out. For example, in various embodiments herein, the coating can be formed by applying a first coating composition to a substrate to form a first layer. The first coating composition can include a non-photoreactive polyvinylpyrrolidone and other components described herein (such as a photoreactive polyvinylpyrrolidone and a cross-linking compound). Then, a second coating composition can be applied over the first layer to form a second layer. The second coating composition can include, for example, a poly(acrylic acid). Then, the non-photoreactive polyvinylpyrrolidone can be allowed to diffuse into the second layer from the first layer. In various embodiments, the coating compositions can have compatible solvents to facilitate diffusion. For example, in various embodiments, a solvent of isopropyl alcohol (IPA) and water can be used.

Figure 4:
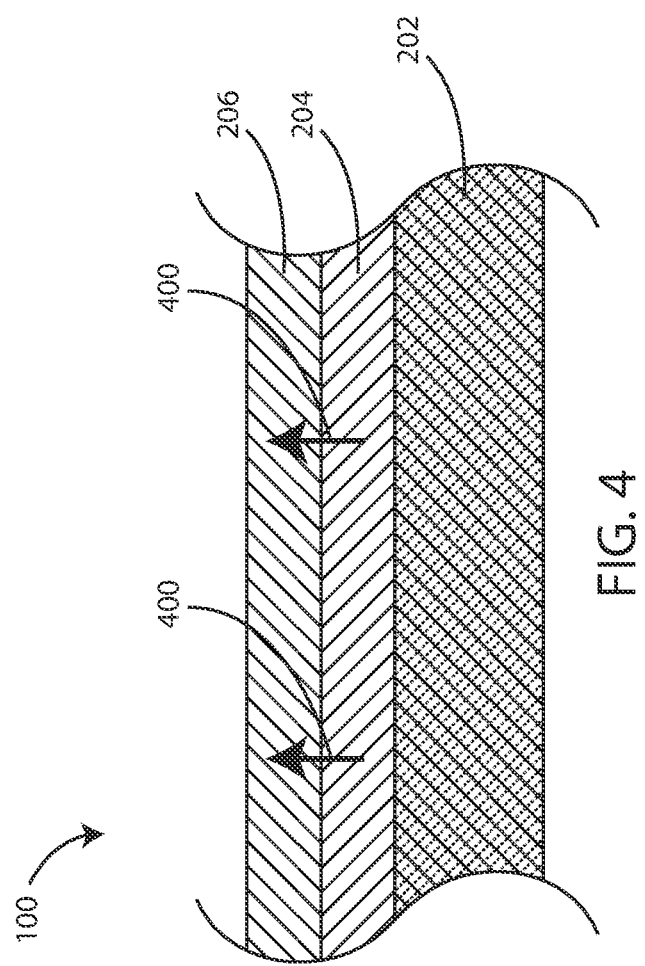
FIG. 4 is a cross-sectional view of a coating in accordance with various embodiments herein.

Referring now to FIG. 4, a cross-sectional view of a coating is shown in accordance with various embodiments herein. FIG. 4 shows a lubricious coated medical device 100. As with FIG. 2, the lubricious coated medical device 100 includes a substrate 202, a first layer 204, and a second layer 206. A non-photoreactive polyvinylpyrrolidone from the first layer 204 can be allowed to diffuse into the second layer 206 in the direction of arrows 400 forming a concentration gradient of non-photoreactive polyvinylpyrrolidone in the second layer 206.

Figure 5:
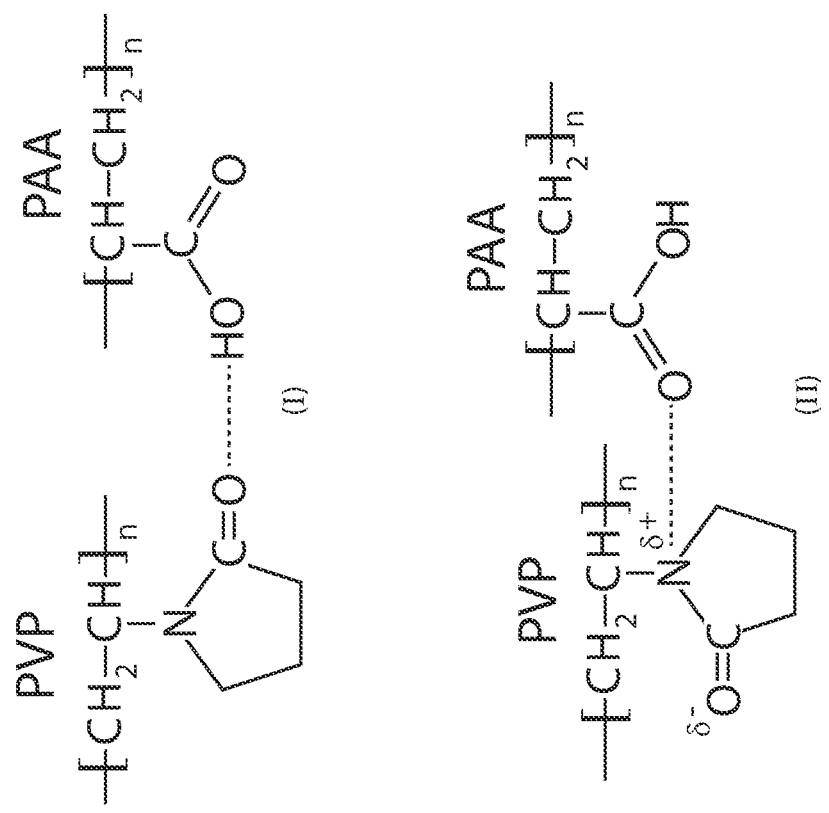
FIG. 5 is an illustration of PVP complexing with PAA in accordance with embodiments herein.

Referring now to FIG. 5, an illustration of a vinyl pyrrolidone polymer (PVP) complexing with a polyacrylic acid polymer (PAA) is shown in accordance with embodiments herein. For example, the PAA of the second layer can undergo hydrogen bonding with the PVP of the first coated layer. More specifically, hydrogen bonding between the polymers can involve the carbonyl oxygens of both the pyrrolidone ring and the carboxylic acid, as shown in FIG. 5. In this manner, the PVP can form a complex with the PAA. In some embodiments, the PVP can form a complex with the PAA within a given layer of a coating. In some embodiments, the PVP can form a complex with the PAA at the interface between two layers of a coating.

Figure 6:
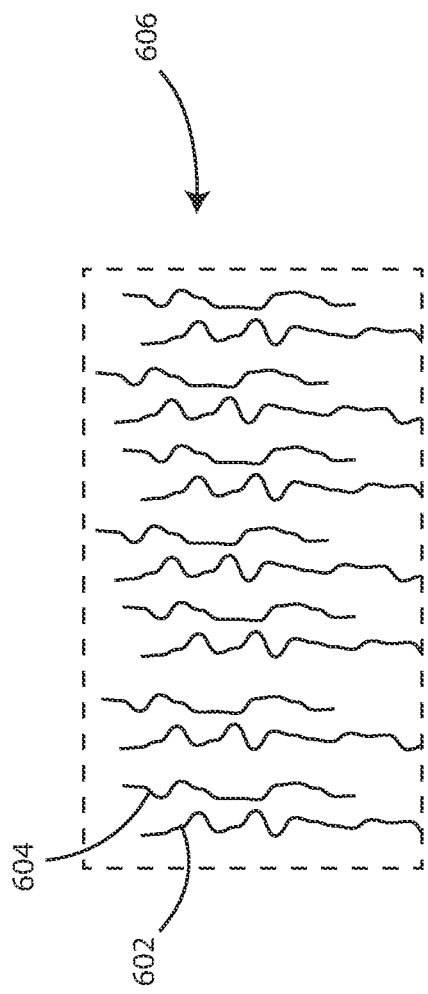
FIG. 6 is a schematic view of a portion of a layer of a coating in accordance with various embodiments herein.

Referring now to FIG. 6, a schematic view is shown of a portion of a layer 506 of a coating in accordance with various embodiments herein. In this embodiment, it can be seen that the polymer chains of PAA 502 form a complex with the polymer chains of PVP 504. While not intending to be bound by theory, the polymer chains of PVP 504 can act as a counterion for the COOH groups on the polymer chains of PAA 502 preventing reaction of the COOH with ethylene oxide ($C_2H_4O$) and thereby preventing the formation of polyethylene glycol (PEG) which would otherwise function to reduce lubricity of the coating.

Figure 7:
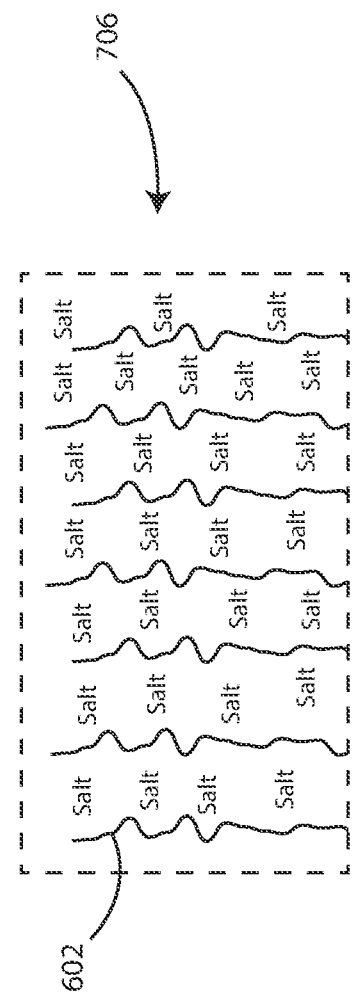
FIG. 7 is a schematic view of a portion of a layer of a coating in accordance with various embodiments herein.

Referring now to FIG. 7, a schematic view is shown of a portion of a layer 606 of a coating in accordance with various embodiments herein. In this embodiment, the pH of environment surrounding the polymer chains of PAA 502 has been raised, such as through the addition of a salt which could be a PAA salt monomer. The raised pH environment protects the exposed COOH groups on the polymer chains of PAA 502 to prevent reaction of the COOH with ethylene oxide ($C_2H_4O$) and thereby prevent the formation of polyethylene glycol (PEG) which would otherwise function to reduce lubricity of the coating.

Methods

Many different methods are contemplated herein, including, but not limited to, methods of making, methods of using, and the like. Specifically, in some embodiments a method of making a lubricious coated medical device is included herein. The method can include obtaining a substrate. The method can further include applying a first layer over the substrate. The first layer can include a photoreactive polyvinylpyrrolidone, a non-photoreactive polyvinylpyrrolidone, and a crosslinking compound. The method can further include applying a second layer over the first layer. The second layer can include a poly(acrylic acid), and a second non-photoreactive polyvinylpyrrolidone, wherein the second non-photoreactive polyvinylpyrrolidone forms a complex with the poly(acrylic acid).

In some embodiments, a method of making a lubricious coated medical device is included. The method can include obtaining a substrate. The method can further include applying a first layer over the substrate. The first layer can include a photoreactive polyvinylpyrrolidone, a non-photoreactive polyvinylpyrrolidone, and a crosslinking compound. The method can further include applying a second layer over the first layer. The second layer can include a poly(acrylic acid). The method can further include applying a third layer over the second layer. The third layer can include a second non-photoreactive polyvinylpyrrolidone.

In some embodiments, a method of making a lubricious coated medical device is included. The method can include obtaining a substrate. The method can further include applying a first layer over the substrate. The first layer can include a photoreactive polyvinylpyrrolidone, a non-photoreactive polyvinylpyrrolidone, and a crosslinking compound. The method can further include applying a second layer over the first layer. The second layer can include a poly(acrylic acid), and a polyvinylpyrrolidone composition, the polyvinylpyrrolidone composition comprising a PVP copolymer.

In some embodiments, a method of making a lubricious coated medical device is included. The method can include obtaining a substrate. The method can further include applying a first layer over the substrate. The first layer can include a photoreactive polyvinylpyrrolidone, a non-photoreactive polyvinylpyrrolidone, and a crosslinking compound. The method can further include applying a second layer over the first layer. The second layer can include the second layer comprising a poly(acrylic acid). In various embodiments, the coating solution used to apply the second layer has a pH of greater than 5. In some embodiments, the second layer can include a salt to raise the pH of the second layer. In some embodiments, the salt can be a PAA salt monomer or polymer.

In some embodiments, a method of making a lubricious coated medical device is included. The method can include obtaining a substrate. The method can further include applying a first layer over the substrate. The first layer can include a photoreactive polyvinylpyrrolidone, a non-photoreactive polyvinylpyrrolidone, and a crosslinking compound. The method can further include applying a second layer over the first layer. The second layer can include a poly(acrylic acid) homopolymer, and a poly(acrylic acid) copolymer.

Polyvinylpyrrolidone Compounds

Various embodiments herein include a polyvinylpyrrolidone homopolymer and/or copolymer. Further details about exemplary polyvinylpyrrolidone polymers (homopolymers and copolymers) are provided as follows. However, it will be appreciated that this is merely provided by way of example and that further variations are contemplated herein.

Polyvinylpyrrolidone polymers herein can include polyvinylpyrrolidone homopolymers as well as polyvinylpyrrolidone subunit containing copolymers. By way of example, polyvinylpyrrolidone copolymers can include subunits of polyvinylpyrrolidone as follows:

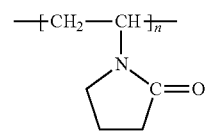

In various embodiments, a PVP copolymer can include at least one including at least one of PVP-co-PEO (polyvinylpyrrolidone-co-polyethylene oxide) and PVP-co-PSB (polyvinylpyrrolidone-co-polysulfobetaine), PVP-co-PAA, and photo-PVP-co-PAA (a photo-derivatized PVP such as PVP modified to include a benzophenone functional group or another photoactivatable functional group).

Polyvinylpyrrolidone polymers herein can be linear or can be branched. Polyvinylpyrrolidone polymers herein can have various molecular weights such as an average molecular weight from 1 kDa to 3000 kDa. In various embodiments, the polyvinylpyrrolidone polymer has an average molecular weight from 10 kDa to 50 kDa. While not intending to be bound by theory, lower molecular weight PVP polymers can be more effective in PAA complexation. In various embodiments, the polyvinylpyrrolidone polymer has an average molecular weight of less than 15, 12, 10, 8, 6, or 4 kDa, or a molecular weight falling within a range between any of the foregoing. In various embodiments, the polyvinylpyrrolidone polymer has an average molecular weight of between 4 kDa and 12 kDa.

In various embodiments, the polyvinylpyrrolidone component is a blend of different molecular weight PVP compounds.

Exemplary non-photo derivatized polyvinylpyrrolidone polymers can include, for example, PVP K12, PVP K17, PVP K30, PVP K90, and the like.

Polyvinylpyrrolidone polymers herein can be used to form a PVP hydrogel.

In various embodiments, the polyvinylpyrrolidone can include a non-photoreactive polyvinylpyrrolidone. However, instead of or in addition to non-photoreactive polyvinylpyrrolidone, in various embodiments, the polyvinylpyrrolidone can also include a photoreactive polyvinylpyrrolidone ("photo-PVP"). Photoreactive polyvinylpyrrolidones can include homopolymers and/or copolymers where they are derivatized to include a photoreactive group. In various embodiments, the photoreactive polyvinylpyrrolidone can specifically include a benzophenone group.

An exemplary photoreactive polyvinylpyrrolidone copolymer can include poly[vinyl pyrrolidone-co-N-(3-(4-benzoylbenzamideo)propyl)methacrylamide](or PVP-co-APMA with 80 to 99.9 mole percent PVP and 20 to 0.1 mole percent APMA). By way of example, an exemplary photoreactive polyvinylpyrrolidone is as follows:

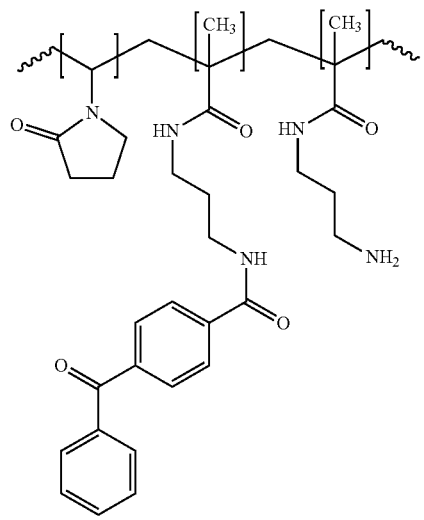

Another exemplary photoreactive polyvinylpyrrolidone copolymer (acetylated PVP-APMA-BBA; or acetylated photo-PVP) is as follows:

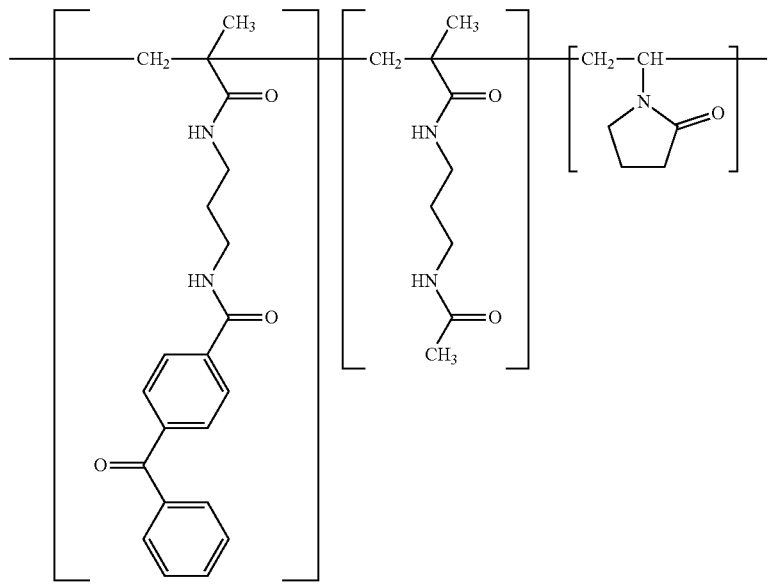

This compound can be prepared by a copolymerization of 1-vinyl-2-pyrrolidone and N-(3-aminopropyl)methacrylamide (APMA), followed by photoderivatization of the polymer using 4-benzoylbenzoyl chloride under Schotten-Baumann conditions. The unreacted amines of the photopolymer can be further acetylated using acetic anhydride. The polyvinylpyrrolidone used herein can be of various molecular weights. In some embodiments, a non-photoreactive polyvinylpyrrolidone herein can have an average molecular weight from 1 kDa to 3000 kDa. In various embodiments, a non-photoreactive polyvinylpyrrolidone can have an average molecular weight from 10 kDa to 50 kDa. In various embodiments, a non-photoreactive polyvinylpyrrolidone can be a blend of different molecular weight PVP compounds. For example, in various embodiments, the second non-photoreactive polyvinylpyrrolidone of the second layer can be a blend of at least two different molecular weight average PVP compositions.

In various embodiments, a weight ratio of a branched PVP to a poly(acrylic acid) in the same layer or a different layer is from 70:100 to 10:90.

In various embodiments, a non-photoreactive polyvinylpyrrolidone of an outer layer or a PAA containing layer can include a blend of branched and unbranched PVP.

Poly(Acrylic Acid) Homopolymers and Copolymers

Various embodiments herein include a poly(acrylic acid) (PAA) homopolymer or PAA containing copolymer. Further details about exemplary PAA homopolymers and copolymers are provided as follows. However, it will be appreciated that this is merely provided by way of example and that further variations are contemplated herein.

As used herein an "acrylic acid polymer" refers to polymers including acrylic acid monomeric units. The acrylic acid polymer can be an acrylic acid homopolymer or an acrylic acid copolymer including acrylic acid and one or more (e.g., two, three, four, five, etc.) other monomeric units that are different than acrylic acid. In embodiments, in a poly(acrylic acid) copolymer, the acrylic acid can be the primary monomer (molar quantity), such as present in an amount of greater than 50% (mol), 55% (mol) or greater, 60% (mol) or greater, 65% (mol) or greater, 70% (mol) or greater, 75% (mol) or greater, 80% (mol) or greater, 85% (mol) or greater, 90% (mol) or greater, 92.5% (mol) or greater, 95% (mol) or greater, 97.5% (mol) or 99% (mol) or greater. In exemplary embodiments, acrylic acid is present in the copolymer in the range of about 75% (mol) to about 100% (mol), about 85% (mol) to about 100% (mol), about 95% (mol) to about 100% (mol), or about 98% (mol) to about 100% (mol).

In some embodiments, the acrylic acid polymer in the top coating can have an average molecular weight of 150 kDa or greater. In yet other embodiments the acrylic acid polymer in the top coating may have an average molecular weight of 250 kDa or greater, 350 kDa, 450 kDa, 550 kDa, 650 kDa or greater or even in some cases an average molecular weight of 750 kDa or greater.

In some modes of preparation, the acrylic acid polymer is prepared by free radical polymerization of acrylic acid at (e.g, about a 0.8M concentration) in deionized water. In modes where a portion of the acid groups are neutralized, a concentrated base such as NaOH is added to the acrylic acid solution. Next, an initiator such as ammonium persulfate is added with stirring. The polymerization solution can be degassed with nitrogen and stirred for hours (e.g., 12-24 hours) at an elevated temperature (e.g., greater than 50° C.). The polymer can then be polymerized against continuous flow deionized water using 12-14 K dialysis tubing, and then isolated by lyophilization.

In some embodiments, an acrylic acid polymer of one layer can undergo hydrogen bonding with a vinyl pyrrolidone polymer of a different layer. More specifically, hydrogen bonding between the polymers can involve the carbonyl oxygens of both the pyrrolidone ring and the carboxylic acid, as shown in FIG. 4. In some embodiments, an acrylic acid polymer of one layer can undergo hydrogen bonding with a vinyl pyrrolidone polymer within the same layer.

In various embodiments, the poly(acrylic acid) is from 50 to 90 percent protonated. In various embodiments, the poly(acrylic acid) is from 60 to 80 percent protonated.

Various embodiments herein can also include a PAA containing copolymer. In various embodiments, the poly (acrylic acid) copolymer can include a random copolymer.

In various embodiments, the poly(acrylic acid) copolymer can include a block copolymer.

PAA containing copolymers herein can include PAA subunits along with various other polymeric subunits. By way of example, in various embodiments, the poly(acrylic acid) copolymer can include at least one including at least one of PAA-co-PVP (photo-reactive or non photo-reactive), PAA-co-PAAm, and PAA-co-PVA. Such copolymers can be prepared by a copolymerization of acrylic acid and/or PAA and PVP, PAAm, and/or PVA.

In various embodiments, a poly(acrylic acid) copolymer is used along with a poly(acrylic acid) homopolymer. Various proportions of the two can be used. In some embodiments, the second layer can include a weight ratio of the poly(acrylic acid) copolymer to the poly(acrylic acid) homopolymer of 100:1 to 20:80. In various embodiments, the poly(acrylic acid) copolymer can have a backbone molar ratio of polyacrylic acid to comonomer of 85:15 to 30:70.

Crosslinking Compounds

Various embodiments herein include a crosslinking compound. Further details about the crosslinking compound are provided as follows. However, it will be appreciated that this is merely provided by way of example and that further variations are contemplated herein.

In some embodiments, the crosslinking agent(s) can have a molecular weight of less than about 1500 kDa, but in other embodiments can be larger. In some embodiments the crosslinking agent can have a molecular weight of less than about 1200, 1100, 1000, 900, 800, 700, 600, 500, or 400 or less, or a molecular weight falling within a range between any of the foregoing.

In various embodiments, cross-linking agents include one or more photoreactive groups attached to a linking group. The cross-linking agent (or linking agent) can be represented by the formula Photo$^1$-LG-Photo$^2$, wherein Photo$^1$ and Photo$^2$ independently represent at least one photoreactive group and LG represents a linking group. The term "linking group" as used herein, refers to a segment or group of molecules configured to connect two or more molecule to each another. In some embodiments, the linking group can include a heteroatom. In some embodiments, the linking group lacks a heteroatom. In one embodiment, the linking group includes at least one silicon atom. In another embodiment, the linking group includes at least one phosphorus atom.

In some embodiments, the linking group can be a degradable linking group, which in other embodiments the linking group can be a non-degradable linking group. The term "degradable linking group" as used herein, refers to a moiety configured to connect one molecule to another, wherein the linking group is capable of cleavage under one or more conditions. The term "biodegradable" as used herein, refers to degradation in a biological system, and includes for example, enzymatic degradation or hydrolysis. It should be noted that the term "degradable" as used herein includes both enzymatic and non-enzymatic (or chemical) degradation. It is also understood that hydrolysis can occur in the presence of or without an acid or base. In one embodiment, the linking agent is water soluble. In another embodiment, the linking agent is not water soluble.

In various embodiments the linking group can function as a spacer, for example, to increase the distance between the photoreactive groups of the linking agent. For example, in some instances it may be desirable to provide a spacer to reduce steric hindrance that may result between the photoreactive groups, which could interfere with the ability of the photoreactive groups to form covalent bonds with a support surface, or from serving as a photoinitiator for polymerization. As described herein, it is possible to vary the distance between the photoreactive groups, for example, by increasing or decreasing the spacing between one or more photoreactive groups.

As described herein, one or more photoreactive groups can be bound to a linking group by a degradable or a non-degradable linkage. In various embodiments, the degradable linkage between the photoreactive group and the linking group includes at least one heteroatom, including, but not limited to oxygen, nitrogen, selenium, sulfur or a combination thereof. In one embodiment, a photoreactive group, linking group and heteroatom form an ether ($R^1$—

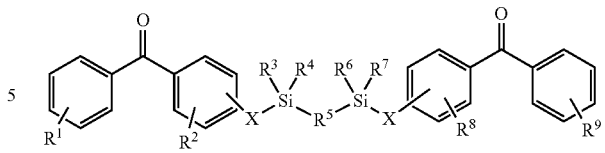

wherein $R^1$, $R^2$, $R^8$ and $R^9$ can be any substitution, including, but not limited to H, alkyl, halide, hydroxyl, amine, or a combination thereof; $R^3$, $R^4$, $R^6$ and $R^7$ can be alkyl, aryl or a combination thereof; $R^5$ can be any substitution, including but not limited to O, alkyl or a combination thereof; and each X, independently, can be O, N, Se, S, or alkyl, or a combination thereof. One specific embodiment is shown below:

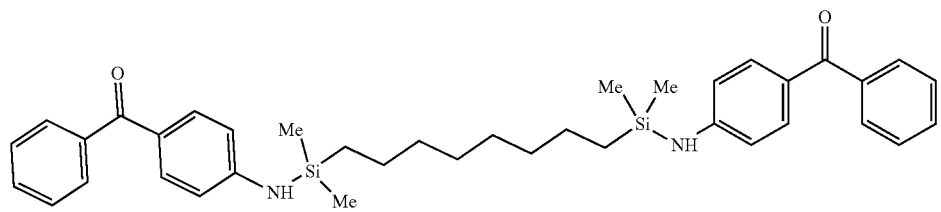 [SMILES: C[Si](C)(CCCCCCCC[Si](C)(C)Nc1ccc(C(=O)c2ccccc2)cc1)Nc1ccc(C(=O)c2ccccc2)cc1]

O—$R^2$), wherein $R^1$ is a photoreactive group and $R^2$ is a linking group. In another embodiment, a photoreactive group, linking group and heteroatom form an amine,

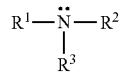

wherein $R^1$ is a photoreactive group, $R^2$ is a linking group, and $R^3$ is hydrogen, aryl or alkyl, a photoreactive group, or a hydroxyl or salt thereof. In one embodiment, $R^3$ is cyclic, linear or branched, saturated or unsaturated, aromatic or heteroaromatic, or a combination thereof. The stability of the ether and/or amine linkage can be influenced depending upon the size (e.g., chain length, branching, bulk, etc.) of the substituents. For example, bulkier substituents will generally result in a more stable linkage (i.e., a linking agent that is slower to degrade in the presence of water and/or acid).

In various embodiments, the linking group includes one or more silicon atoms. In a particular embodiment, the linking group includes one silicon atom (which can be referred to as a monosilane) covalently bound to at least two photoreactive groups. In another embodiment, the linking group includes at least two silicon atoms (which can be referred to as a disilane). In one embodiment, the linking group can be represented by the formula Si—Y—Si, wherein Y represents a linker that can be null (e.g., the linking group includes a direct Si—Si bond), an amine, ether, linear or branched $C_1$-$C_{10}$ alkyl, or a combination thereof. In one embodiment, Y is selected from O, $CH_2$, $OCH_2CH_2O$ and $O(CH_2CH_2O)_n$, wherein n is an integer between 1 and 5, between 1 and 10, between 1 and 15, between 1 and 20, between 1 and 25, or between 1 and 30. One embodiment of a disilane linking agent is shown below In various embodiments, the linking agent can be represented by the formula

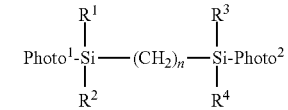

wherein $Photo^1$ and $Photo^2$, independently, represent one or more photoreactive groups and n is an integer between 1 and 10, wherein the linking agent comprises a covalent linkage between at least one photoreactive group and the linking group, wherein the covalent linkage between at least one photoreactive group and the linking group is interrupted by at least one heteroatom. In general, a longer hydrocarbon chain between the two silicon atoms will tend to increase the flexibility of the linking agent and may facilitate crosslinking between a greater number of polymers than a linking agent with a shorter carbon chain, since the photoreactive groups can react with polymers located farther apart from one another. In the formula shown above, $R^1$, $R^2$, $R^3$, $R^4$ are independently alkyl or aryl, including, but not limited to cyclic, linear or branched, saturated or unsaturated, aromatic or heteroaromatic, or a combination thereof. In a more particular embodiment, $R^1$-$R^4$ are independently phenyl, methyl, ethyl, isopropyl, t-butyl, or a combination thereof. In another embodiment, $R^1$-$R^4$ can also be, independently, a photoreactive group. In yet another embodiment, $R^1$-$R^4$ can also be, independently, hydroxyl or salt thereof. In one embodiment, the hydroxyl salt includes a counterion that is lithium, sodium, potassium, or a combination thereof.

In another embodiment, the linking agent can be represented by the formula

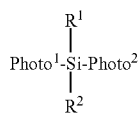

wherein Photo¹ and Photo², independently, represent one or more photoreactive group, wherein the linking agent comprises a covalent linkage between at least one photoreactive group and the linking group, wherein the covalent linkage between at least one photoreactive group and the linking group is interrupted by at least one heteroatom; $R^1$ and $R^2$ are independently alkyl or aryl, including, but not limited to cyclic, linear or branched, saturated or unsaturated, aromatic or heteroaromatic, or a combination thereof. In a more particular embodiment, $R^1$ and $R^2$ are independently phenyl, methyl, ethyl, isopropyl, t-butyl, or a combination thereof. $R^1$ and $R^2$ can also be, independently, a photoreactive group, wherein the linking agent comprises a covalent linkage between at least one photoreactive group and the linking group, wherein the covalent linkage between at least one photoreactive group and the linking group is interrupted by at least one heteroatom; or hydroxyl or salt thereof. In one embodiment, the hydroxyl salt includes a counterion that is lithium, sodium, potassium, or a combination thereof. One embodiment of a monosilane linking agent is shown below

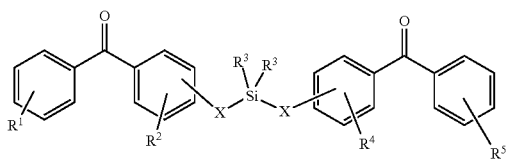

in which $R^1$ and $R^5$ can be any substitution, including, but not limited to H, halogen, amine, hydroxyl, alkyl, or a combination thereof; $R^2$ and $R^4$ can be any substitution, except OH, including, but not limited to H, alkyl or a combination thereof; $R^3$ can be alkyl, aryl or a combination thereof, including, for example, methyl, ethyl, propyl, isopropyl and butyl; and X, independently, can be O, N, Se, S, alkyl or a combination thereof.

In another embodiment, the linking group includes one or more phosphorous atoms. In one embodiment, the linking group includes one phosphorus atom (which can also be referred to as a mono-phosphorus linking group). In another embodiment, the linking agent includes two phosphorus atoms (which can also be referred to as a bis-phosphorus linking group). In one embodiment, the linking group comprises at least one phosphorus atom with a phosphorus-oxygen double bond (P═O), wherein at least one or two photoreactive groups are bound to the phosphorus atom. In another embodiment, the linking group comprises one phosphorus atom with a phosphorus-oxygen double bond (P═O), wherein two or three photoreactive groups are covalently bound to the phosphorus atom. In another embodiment, the linking group comprises at least two phosphorus atoms, wherein at least one phosphorus atom includes a phosphorus-oxygen double bond (P═O), and at least one or two photoreactive groups are covalently bound to each phosphorus atom.

In a more particular embodiment, the linking agent can be represented by the formula:

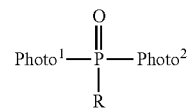

wherein Photo¹ and Photo², independently, represent one or more photoreactive groups, wherein the linking agent comprises a covalent linkage between at least one photoreactive group and the linking group, wherein the covalent linkage between at least one photoreactive group and the linking group is interrupted by at least one heteroatom and R is alkyl or aryl, a photoreactive group, hydroxyl or salt thereof, or a combination thereof. In one embodiment, the hydroxyl salt includes a counterion that is lithium, sodium, potassium, or a combination thereof. In a more particular embodiment, R is cyclic, linear or branched, saturated or unsaturated, aromatic or heteroaromatic, or a combination thereof. In a more particular embodiment, R is phenyl, methyl, ethyl, isopropyl, t-butyl, or a combination thereof.

In another embodiment, the linking agent can be represented by formula:

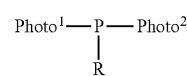

wherein Photo¹ and Photo² independently, represent one or more photoreactive groups, wherein the linking agent comprises a covalent linkage between at least one photoreactive group and the linking group, wherein the covalent linkage between at least one photoreactive group and the linking group is interrupted by at least one heteroatom and R is alkyl or aryl, a photoreactive group (wherein the covalent linkage between the photoreactive group and the linking group may be interrupted by at least one heteroatom), hydroxyl or salt thereof, or a combination thereof. In one embodiment, the hydroxyl salt includes a counterion that is lithium, sodium, potassium, or a combination thereof. In a more particular embodiment, R is cyclic, linear or branched, saturated or unsaturated, aromatic or heteroaromatic, or a combination thereof. In one embodiment, R is phenyl, methyl, ethyl, isopropyl, t-butyl, or a combination thereof.

In another embodiment, the linking agent can be represented by the formula:

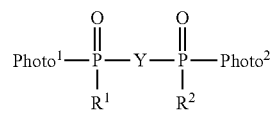

wherein Photo¹ and Photo², independently, represent one or more photoreactive groups, wherein the linking agent comprises a covalent linkage between at least one photoreactive group and the linking group, wherein the covalent linkage between at least one photoreactive group and the linking group is interrupted by at least one heteroatom; Y represents a linker that can be null (i.e., not present, such that the linking group includes a direct P—P bond), N or O, linear or branched $C_1$-$C_{10}$ alkyl, or a combination thereof; and $R^1$ and $R^2$ are independently alkyl, aryl, a photoreactive group (wherein the covalent linkage between the photoreactive group and the linking group can be interrupted by at least one heteroatom), hydroxyl or salt thereof, or a combination thereof. In one embodiment, Y is selected from O, CH$_2$, OCH$_2$O, OCH$_2$CH$_2$O and O(CH$_2$CH$_2$O)$_n$, wherein n is an integer between 1 and 5, between 1 and 10, between 1 and 15, between 1 and 20, between 1 and 25, or between 1 and 30. In one embodiment, the hydroxyl salt counterion is lithium, sodium, potassium, or a combination thereof. In a more particular embodiment, R$^1$ and R$^2$ are independently, cyclic, linear or branched hydrocarbon, saturated or unsaturated, aromatic or heteroaromatic, or a combination thereof. In one embodiment, R$^1$ and R$^2$ are independently phenyl, methyl, ethyl, isopropyl, t-butyl, or a combination thereof. In general, a longer hydrocarbon chain between the two phosphorus atoms will tend to increase the flexibility of the linking agent and may facilitate crosslinking between a greater number of polymers than a linking agent with a shorter carbon chain, since the reactive photoreactive groups can react with polymers located farther apart from one another. In one embodiment, Y can be O, CH$_2$, OCH$_2$CH$_2$O and O(CH$_2$CH$_2$O)$_n$ wherein n is an integer between 1 and 5, between 1 and 10, between 1 and 15, between 1 and 20, between 1 and 25, or between 1 and 30. One embodiment is shown below

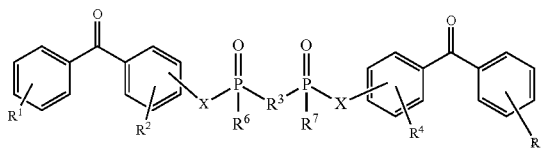

in which R$^1$, R$^2$, R$^4$ and R$^5$ can be any substitution, including but not limited to H, alkyl, halogen, amine, hydroxyl, or a combination thereof; R$^3$ can be any substitution, including but not limited to O, alkyl, or a combination thereof; and each X can independently be O, N, Se, S, alkyl, or a combination thereof. In one embodiment, the linking agent includes one or more phosphorester bonds and one or more phosphoramide bonds, and can be represented by the formula:

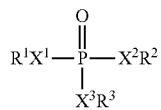

wherein X and X$^2$ are, independently, O, N, Se, S or alkyl; R$^1$ and R$^2$ are independently, one or more photoreactive groups, and X$^3$ is O, N, Se, S, alkyl or aryl; R$^3$ is alkyl or aryl, including, but not limited to cyclic, linear or branched, saturated or unsaturated, aromatic or heteroaromatic, or a combination thereof. In a more particular embodiment, R$^3$ is phenyl, methyl, ethyl, isopropyl, t-butyl, or a combination thereof. R$^3$ can also be a photoreactive group or a hydroxyl or salt thereof. In one embodiment, the hydroxyl salt counterion is lithium, sodium, potassium, or a combination thereof.

In one embodiment, the linking agent comprises a triphosphorester, which can be represented by the formula.

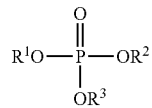

wherein R$^1$ and R$^2$ are independently, one or more photoreactive groups, and R$^3$ is alkyl or aryl, including, but not limited to cyclic, linear or branched, saturated or unsaturated, aromatic or heteroaromatic, or a combination thereof. In a more particular embodiment, R$^3$ is phenyl, methyl, ethyl, isopropyl, t-butyl, or a combination thereof. R$^3$ can also be a photoreactive group or hydrogen, or a hydroxyl salt. In one embodiment, the hydroxyl salt counterion is lithium, sodium, potassium, or a combination thereof.

Some specific embodiments include the following linking agents:

(a) bis(4-benzoylphenyl) hydrogen phosphate:

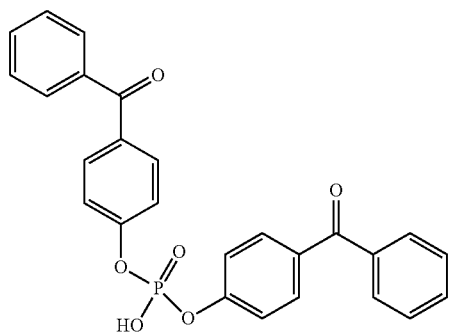 [SMILES: O=C(c1ccccc1)c1ccc(OP(=O)(O)Oc2ccc(C(=O)c3ccccc3)cc2)cc1]

(b) sodium bis(4-benzoylphenyl phosphate):

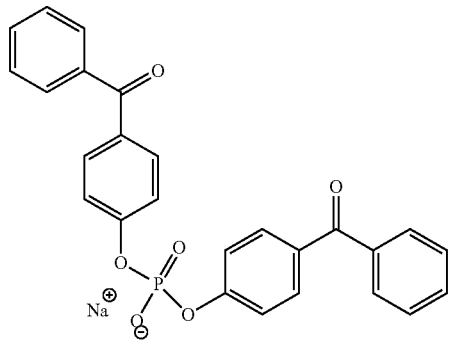 [SMILES: O=C(c1ccccc1)c1ccc(OP(=O)([O-])Oc2ccc(C(=O)c3ccccc3)cc2)cc1 ; [Na+]]

(c) tris(4-benzyolphenyl) phosphate:

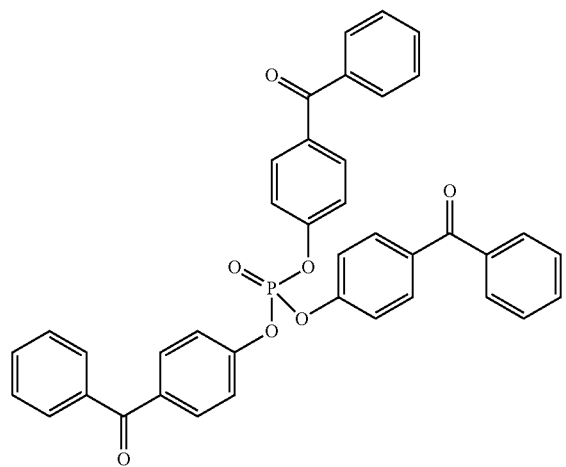 [SMILES: O=C(c1ccccc1)c1ccc(OP(=O)(Oc2ccc(C(=O)c3ccccc3)cc2)Oc2ccc(C(=O)c3ccccc3)cc2)cc1]

(d) tetrakis(4-benzoylphenyl)methylenebis(phosphonate)

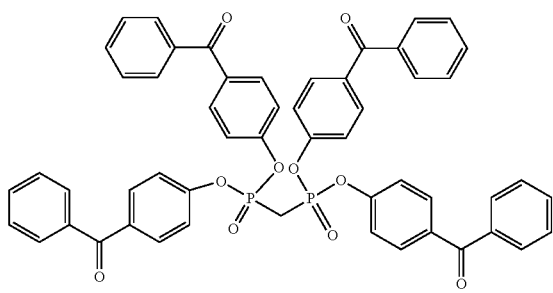 [SMILES: O=C(c1ccccc1)c1ccc(OP(=O)(CP(=O)(Oc2ccc(C(=O)c3ccccc3)cc2)Oc2ccc(C(=O)c3ccccc3)cc2)Oc2ccc(C(=O)c3ccccc3)cc2)cc1]

In another embodiment, the linking agent comprises a triphosphoramide, which can be represented by the formula.

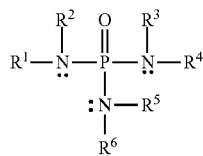

wherein $R^1$-$R^6$ are independently, a photoreactive group, a hydroxyl or salt thereof, alkyl or aryl, or a combination thereof, wherein at least two of $R^1$-$R^6$ are, independently, a photoreactive group. In one embodiment, the hydroxyl salt counterion is lithium, sodium, potassium, or a combination thereof. In a more particular embodiment, $R^1$-$R^6$ are independently cyclic, linear or branched, saturated or unsaturated, aromatic or heteroaromatic, or a combination thereof. In a more particular embodiment, $R^1$-$R^6$ are, independently, phenyl, methyl, ethyl, isopropyl, t-butyl, or a combination thereof.

In some embodiments, the photoactivatable cross-linking agent can be ionic, and can have good solubility in an aqueous composition, such as the first and/or second coating composition. Thus, in some embodiments, at least one ionic photoactivatable cross-linking agent is used to form the coating. In some cases, an ionic photoactivatable cross-linking agent can crosslink the polymers within the second coating layer which can also improve the durability of the coating.

Any suitable ionic photoactivatable cross-linking agent can be used. In some embodiments, the ionic photoactivatable cross-linking agent is a compound of formula I: $X_1$—Y—$X_2$ where Y is a radical containing at least one acidic group, basic group, or a salt of an acidic group or basic group. $X_1$ and $X_2$ are each independently a radical containing a latent photoreactive group. The photoreactive groups can be the same as those described herein. Spacers can also be part of $X_1$ or $X_2$ along with the latent photoreactive group. In some embodiments, the latent photoreactive group includes an aryl ketone or a quinone.

The radical Y in formula I provides the desired water solubility for the ionic photoactivatable cross-linking agent. The water solubility (at room temperature and optimal pH) is at least about 0.05 mg/ml. In some embodiments, the solubility is about 0.1 to about 10 mg/ml or about 1 to about 5 mg/ml.

In some embodiments of formula I, Y is a radical containing at least one acidic group or salt thereof. Such a photoactivatable cross-linking agent can be anionic depending upon the pH of the coating composition. Suitable acidic groups include, for example, sulfonic acids, carboxylic acids, phosphonic acids, and the like. Suitable salts of such groups include, for example, sulfonate, carboxylate, and phosphate salts. In some embodiments, the ionic cross-linking agent includes a sulfonic acid or sulfonate group. Suitable counter ions include alkali, alkaline earths metals, ammonium, protonated amines, and the like.

For example, a compound of formula I can have a radical Y that contains a sulfonic acid or sulfonate group; $X_1$ and $X_2$ can contain photoreactive groups such as aryl ketones. Such compounds include 4,5-bis(4-benzoylphenylmethyleneoxy)benzene-1,3-disulfonic acid or salt; 2,5-bis(4-benzoylphenylmethyleneoxy)benzene-1,4-disulfonic acid or salt; 2,5-bis(4-benzoylmethyleneoxy)benzene-1-sulfonic acid or salt; N,N-bis[2-(4-benzoylbenzyloxy)ethyl]-2-aminoethanesulfonic acid or salt, and the like. See U.S. Pat. No. 6,278,018. The counter ion of the salt can be, for example, ammonium or an alkali metal such as sodium, potassium, or lithium.

In other embodiments of formula I, Y can be a radical that contains a basic group or a salt thereof. Such Y radicals can include, for example, an ammonium, a phosphonium, or a sulfonium group. The group can be neutral or positively charged, depending upon the pH of the coating composition. In some embodiments, the radical Y includes an ammonium group. Suitable counter ions include, for example, carboxylates, halides, sulfate, and phosphate. For example, compounds of formula I can have a Y radical that contains an ammonium group; $X_1$ and $X_2$ can contain photoreactive groups that include aryl ketones. Such photoactivatable cross-linking agents include ethylenebis(4-benzoylbenzyldimethylammonium) salt; hexamethylenebis(4-benzoylbenzyldimethylammonium) salt; 1,4-bis(4-benzoylbenzyl)-1,4-dimethylpiperazinediium) salt, bis(4-benzoylbenzyl) hexamethylenetetraminediium salt, bis[2-(4-benzoylbenzyldimethylammonio)ethyl]-4-benzoylbenzylmethylammonium salt; 4,4-bis(4-benzoylbenzyl)morpholinium salt; ethylenebis[(2-(4-benzoylbenzyldimethylammonio)ethyl)-4-benzoylbenzylmethylammonium]salt; and 1,1,4,4-tetrakis(4-benzoylbenzyl)piperzinediium salt. See U.S. Pat. No. 5,714,360. The counter ion is typically a carboxylate ion or a halide. On one embodiment, the halide is bromide.

In other embodiments, the ionic photoactivatable cross-linking agent can be a compound having the formula:

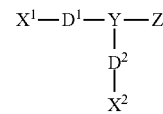

wherein $X^1$ includes a first photoreactive group; $X^2$ includes a second photoreactive group; Y includes a core molecule; Z includes at least one charged group; $D^1$ includes a first degradable linker; and $D^2$ includes a second degradable linker. Additional exemplary degradable ionic photoactivatable cross-linking agents are described in US Patent Application Publication US 2011/0144373 (Swan et al., "Water Soluble Degradable Crosslinker"), the disclosure of which is incorporated herein by reference.

In some aspects a non-ionic photoactivatable cross-linking agent can be used. In one embodiment, the non-ionic photoactivatable cross-linking agent has the formula $XR_1R_2R_3R_4$, where X is a chemical backbone, and $R_1$, $R_2$, $R_3$, and $R_4$ are radicals that include a latent photoreactive group. Exemplary non-ionic cross-linking agents are described, for example, in U.S. Pat. Nos. 5,414,075 and 5,637,460 (Swan et al., "Restrained Multifunctional Reagent for Surface Modification"). Chemically, the first and second photoreactive groups, and respective spacers, can be the same or different.

In other embodiments, the non-ionic photoactivatable cross-linking agent can be represented by the formula:

$$PG^2-LE^2-X-LE^1-PG^1$$

wherein $PG^1$ and $PG^2$ include, independently, one or more photoreactive groups, for example, an aryl ketone photoreactive group, including, but not limited to, aryl ketones such as acetophenone, benzophenone, anthraquinone, anthrone, anthrone-like heterocycles, their substituted derivatives or a combination thereof; $LE^1$ and $LE^2$ are, independently, linking elements, including, for example, segments that include urea, carbamate, or a combination thereof; and X represents a core molecule, which can be either polymeric or non-polymeric, including, but not limited to a hydrocarbon, including a hydrocarbon that is linear, branched, cyclic, or a combination thereof; aromatic, non-aromatic, or a combination thereof; monocyclic, polycyclic, carbocyclic, heterocyclic, or a combination thereof; benzene or a derivative thereof; or a combination thereof. Other non-ionic cross-linking agents are described, for example, in U.S. application Ser. No. 13/316,030 filed Dec. 9, 2011 (Publ. No. US 2012/0149934) (Kurdyumov, "Photocrosslinker"), the disclosure of which is incorporated herein by reference.

Further embodiments of non-ionic photoactivatable cross-linking agents can include, for example, those described in U.S. Provisional Application 61/494,724 filed Jun. 8, 2011 (now U.S. application Ser. No. 13/490,994) (Swan et al., "Photo-Vinyl Primers/Crosslinkers"), the disclosure of which is incorporated herein by reference. Exemplary cross-linking agents can include non-ionic photoactivatable cross-linking agents having the general formula $R^1-X-R^2$, wherein $R^1$ is a radical comprising a vinyl group, X is a radical comprising from about one to about twenty carbon atoms, and $R^2$ is a radical comprising a photoreactive group.

Some suitable cross-linking agents are those formed by a mixture of the chemical backbone molecule (such as pentaerythritol) and an excess of a derivative of the photoreactive group (such as 4-bromomethylbenzophenone). An exemplary product is tetrakis(4-benzoylbenzyl ether) of pentaerythritol (tetrakis(4-benzoylphenylmethoxymethyl) methane). See U.S. Pat. Nos. 5,414,075 and 5,637,460.

A single photoactivatable cross-linking agent or any combination of photoactivatable cross-linking agents can be used in forming the coating. In some embodiments, at least one nonionic cross-linking agent such as tetrakis(4-benzoylbenzyl ether) of pentaerythritol can be used with at least one ionic cross-linking agent. For example, at least one non-ionic photoactivatable cross-linking agent can be used with at least one cationic photoactivatable cross-linking agent such as an ethylenebis(4-benzoylbenzyldimethylammonium) salt or at least one anionic photoactivatable cross-linking agent such as 4,5-bis(4-benzoyl-phenylmethyleneoxy)benzene-1,3-disulfonic acid or salt. In another example, at least one nonionic cross-linking agent can be used with at least one cationic cross-linking agent and at least one anionic cross-linking agent. In yet another example, a least one cationic cross-linking agent can be used with at least one anionic cross-linking agent but without a non-ionic cross-linking agent.

An exemplary cross-linking agent is disodium 4,5-bis[(4-benzoylbenzyl)oxy]-1,3-benzenedisulfonate (DBDS). This reagent can be prepared by combining 4,5-Dihydroxybenzyl-1,3-disulfonate (CHBDS) with 4-bromomethylbenzophenone (BMBP) in THF and sodium hydroxide, then refluxing and cooling the mixture followed by purification and recrystallization (also as described in U.S. Pat. No. 5,714,360, incorporated herein by reference).

A further exemplary cross-linking agent is ethylenebis(4-benzoylbenzyldimethylammonium) dibromide. This agent can be prepared as described in U.S. Pat. No. 5,714,360, the content of which is herein incorporated by reference.

Further cross-linking agents can include the cross-linking agents described in U.S. Publ. Pat. App. No. 2010/0274012 and U.S. Pat. No. 7,772,393 the content of all of which is herein incorporated by reference.

In some embodiments, cross-linking agents can include boron-containing linking agents including, but not limited to, the boron-containing linking agents disclosed in U.S. 61/666,516, entitled "Boron-Containing Linking Agents" by Kurdyumov et al., the content of which is herein incorporated by reference. By way of example, linking agents can include borate, borazine, or boronate groups and coatings and devices that incorporate such linking agents, along with related methods. In an embodiment, the linking agent includes a compound having the structure (I):

(I)

wherein $R^1$ is a radical comprising a photoreactive group; $R^2$ is selected from OH and a radical comprising a photoreactive group, an akyl group and an aryl group; and $R^3$ is selected from OH and a radical comprising a photoreactive group. In some embodiments the bonds $B-R^1$, $B-R^2$ and $B-R^3$ can be chosen independently to be interrupted by a heteroatom, such as O, N, S, or mixtures thereof.

Additional agents for use with embodiments herein can include stilbene-based reactive compounds including, but not limited to, those disclosed in U.S. 61/736,436, entitled "Stilbene-Based Reactive Compounds, Polymeric Matrices Formed Therefrom, and Articles Visualizable by Fluorescence" by Kurdyumov et al., the content of which is herein incorporated by reference.

Additional photoreactive agents, cross-linking agents, hydrophilic coatings, and associated reagents are disclosed in US2011/0059874; US 2011/0046255; and US 2010/0198168, the content of all of which is herein incorporated by reference. Further exemplary cross-linking agents are described in U.S. Publ. Pat. App. No. 2011/0245367, the content of which is herein incorporated by reference in its entirety.

Substrates

The substrate can be formed from any desirable material, or combination of materials, suitable for use within the body. In some embodiments the substrate is formed from compliant and flexible materials, such as elastomers (polymers with elastic properties). Exemplary elastomers can be formed from various polymers including polyurethanes and polyurethane copolymers, polyethylene, styrene-butadiene copolymers, polyisoprene, isobutylene-isoprene copolymers (butyl rubber), including halogenated butyl rubber, butadiene-styrene-acrylonitrile copolymers, silicone polymers, fluorosilicone polymers, polycarbonates, polyamides, polyesters, polyvinyl chloride, polyether-polyester copolymers, polyether-polyamide copolymers, and the like. The substrate can be made of a single elastomeric material, or a combination of materials.

Other materials for the substrate can include those formed of polymers, including oligomers, homopolymers, and copolymers resulting from either addition or condensation polymerizations. Examples of suitable addition polymers include, but are not limited to, acrylics such as those polymerized from methyl acrylate, methyl methacrylate, hydroxyethyl methacrylate, hydroxyethyl acrylate, acrylic acid, methacrylic acid, glyceryl acrylate, glyceryl methacrylate, methacrylamide, and acrylamide; vinyls such as ethylene, propylene, vinyl chloride, vinyl acetate, vinyl pyrrolidone, vinylidene difluoride, and styrene. Examples of condensation polymers include, but are not limited to, nylons such as polycaprolactam, polylauryl lactam, polyhexamethylene adipamide, and polyhexamethylene dodecanediamide, and also polyurethanes, polycarbonates, polyamides, polysulfones, poly(ethylene terephthalate), polydimethylsiloxanes, and polyetherketone.

Beyond polymers, and depending on the type of device, the substrate can also be formed of other inorganic materials such as metals (including metal foils and metal alloys), glass and ceramics.

Processes to modify substrates described above can include chemical modifications to improve performance characteristics of the substrate. Specific chemical processes that can be used include ozone treatment, chemical oxidation, acid chemical etching, base chemical etching, plasma treatment and corona treatment, surface grafting, thermally activated coating processes (both covalent and non-covalent) and surface modifications including coatings containing dopamine, tannic acid, plant polyphenols and other catechols or catechol containing derivatives of hydrophilic moieties. Additionally, processes to form substrates described above can include physical modifications for example, but not limited to, sand blasting and surface texturing (for example either during or after the molding process of polymers).

In some embodiments, the modification of substrates as described herein can allow for omission of a base coating layer (such as a hydrophilic layer) as substrate surfaces that have been modified will allow for improved adhesion of a hydrophobic therapeutic agent and cationic agent compared with that of a hydrophilic layer.

Medical Devices

It will be appreciated that embodiments herein include, and can be used in conjunction with, various types of medical devices including, but not limited to, various types of catheters, drug delivery devices such as drug eluting balloon catheters, drug-containing balloon catheters, stents, grafts, and the like.

Some embodiments described herein can be used in conjunction with balloon expandable flow diverters, and self-expanding flow diverters. Other embodiments can include uses in contact with angioplasty balloons (for example, but not limited to, percutaneous transluminal coronary angioplasty and percutaneous transluminal angioplasty). Yet other embodiments can include uses in conjunction with sinoplasty balloons for ENT treatments, urethral balloons and urethral stents for urological treatments and gastro-intestinal treatments (for example, devices used for colonoscopy). Hydrophobic active agent can be transferred to tissue from a balloon-like inflatable device or from a patch-like device. Other embodiments of the present disclosure can further be used in conjunction with micro-infusion catheter devices. In some embodiments, micro-infusion catheter devices can be used to target active agents to the renal sympathetic nerves to treat, for example, hypertension.

Other exemplary medical applications wherein embodiments of the present disclosure can be used further encompass treatments for bladder neck stenosis (e.g. subsequent to transurethral resection of the prostrate), laryngotrachial stenosis (e.g. in conjunction with serial endoscopic dilatation to treat subglottic stenosis, treatment of oral cancers and cold sores and bile duct stenosis (e.g. subsequent to pancreatic, hepatocellular of bile duct cancer). By way of further example, embodiments herein can be used in conjunction with drug applicators. Drug applicators can include those for use with various procedures, including surgical procedures, wherein active agents need to be applied to specific tissue locations. Examples can include, but are not limited to, drug applicators that can be used in orthopedic surgery in order to apply active agents to specific surfaces of bone, cartilage, ligaments, or other tissue through physical contact of the drug applicator with those tissues. Drug applicators can include, without limitation, hand-held drug applicators, drug patches, drug stamps, drug application disks, and the like.

It has been found that optimal formulations/constructions herein can vary depending on the specific structure and/or end use of the medical device bearing the coating as factors such as tortuosity, vessel diameter, and the like are different.

In some embodiments herein, the medical device can be a coronary or peripheral vasculature device, such as a coronary or peripheral vasculature catheter. In some embodiments, the medical device is a coronary or peripheral vasculature device.

In an embodiment, a lubricious coated coronary or peripheral vasculature medical device is included having a substrate and a first layer, wherein the first layer is disposed over the substrate. The first layer can include a photoreactive polyvinylpyrrolidone, a first non-photoreactive polyvinylpyrrolidone, a second non-photoreactive polyvinylpyrrolidone different than the first, and a crosslinking compound. The first non-photoreactive polyvinylpyrrolidone can have an average molecular weight of 1000 to 4000 kDa. In some embodiments, the first non-photoreactive polyvinylpyrrolidone can be PVP K90. The second non-photoreactive polyvinylpyrrolidone can have an average molecular weight of 30 to 70 kDa. In some embodiments, the second non-photoreactive polyvinylpyrrolidone can be PVP K30.

The lubricious coated coronary or peripheral vasculature medical device can also include a second layer, wherein the second layer is disposed over the first layer, the second layer can include a poly(acrylic acid) and a third non-photoreactive polyvinylpyrrolidone. The third non-photoreactive polyvinylpyrrolidone can have an average molecular weight of 3 to 8 kDa. In some embodiments, the third non-photoreactive polyvinylpyrrolidone can be PVP K12 and/or PVP K17.

In some embodiments herein, the medical device can be a neuro device, such as a neuro microcatheter. In an embodiment, a lubricious coated neuro microcatheter device is included having a substrate and a first layer, wherein the first layer is disposed over the substrate. The first layer can include a photoreactive polyvinylpyrrolidone, a first non-photoreactive polyvinylpyrrolidone, a second non-photoreactive polyvinylpyrrolidone different than the first, a third non-photoreactive polyvinylpyrrolidone different than the first and second, and a crosslinking compound. The first non-photoreactive polyvinylpyrrolidone can have an average molecular weight of 1000 to 4000 kDa. In some embodiments, the first non-photoreactive polyvinylpyrrolidone can be PVP K90. The second non-photoreactive polyvinylpyrrolidone can have an average molecular weight of 30 to 70 kDa. In some embodiments, the second non-photoreactive polyvinylpyrrolidone can be PVP K30. The third non-photoreactive polyvinylpyrrolidone can have an average molecular weight of 3 to 8 kDa. In some embodiments, the third non-photoreactive polyvinylpyrrolidone can be PVP K12 or PVP K17.

The lubricious coated neuro microcatheter device can also include a second layer, wherein the second layer is disposed over the first layer, the second layer can include a poly (acrylic acid), a photoreactive polyvinylpyrrolidone, a fourth non-photoreactive polyvinylpyrrolidone, a fifth non-photoreactive polyvinylpyrrolidone, and a cross-linking compound. The fourth non-photoreactive polyvinylpyrrolidone can have an average molecular weight of 30 to 70 kDa. In some embodiments, the fourth non-photoreactive polyvinylpyrrolidone can be PVP K30. The fifth non-photoreactive polyvinylpyrrolidone can have an average molecular weight of 3 to 8 kDa. In some embodiments, the fifth non-photoreactive polyvinylpyrrolidone can be PVP K12 and/or PVP K17.

Aspects may be better understood with reference to the following examples. These examples are intended to be representative of specific embodiments, but are not intended as limiting the overall scope of embodiments herein.

EXAMPLES

Example 1: Formation of Coatings

A first coating composition ("base coat" formulation) was formed by mixing components together in a solvent of isopropyl alcohol and water (60/40) resulting in a composition having a photoreactive polyvinylpyrrolidone (having an average MW of about 1,450 kDa with benzophenone photoreactive groups prepared according to the methods of U.S. Pat. No. 5,637,460) (at 12 mg/ml), a high-molecular weight, non-photoreactive polyvinylpyrrolidone (PVP K90 (1500 kDa), at 16 mg/ml), and a lower-molecular weight, a non-photoreactive polyvinylpyrrolidone (PVP K17-7000 Da or PVP K12-3500 Da) at 5 mg/ml, and a crosslinking compound (sodium bis(4-benzoylphenyl) phosphate—prepared according to methods of U.S. Publ. No. 2012/0046384) (at 0.8 mg/ml).

A second coating composition ("top coat" formulation) was formed by mixing components together in a solvent of isopropyl alcohol and water (15/85) resulting in a composition having a low-molecular weight, non-photoreactive polyvinylpyrrolidone (PVP K12 (3500 Da, at 6 mg/ml), and a polyacrylic acid (MW 450 kDa obtained from Sigma-Aldrich, at 5 mg/ml).

A third coating composition ("alternative top coat" formulation) was formed by mixing components together in a solvent of isopropyl alcohol and water (15/85) resulting in a composition having polyacrylic acid (MW 450 kDa obtained from Sigma-Aldrich, at 5 mg/ml).

A first coated device was formed by applying the first coating composition onto a polymeric substrate, curing the first coating composition, and then applying the second coating composition onto the layer formed by the first coating composition.

A second coated device was formed by applying the first coating composition onto a polymeric substrate, curing the first coating composition, and then applying the third coating composition onto the layer formed by the first coating composition.

Non-photoreactive polyvinylpyrrolidone from the first layer was allowed to diffuse into the second layer.

Example 2: Impact of PVP Molecular Weight on PAA Complexation and Preventing PEG Formation Variations on coating compositions from Example 1 above were formed to investigate the effect of different molecular weights of PVP on PAA complexation. In specific, variant coating compositions were formed using PVP having molecular weights of (K12 (3000-5000 Da), K17 (7000 Da), K30 (44,000 to 54,000 Da), and K90 (1,000,000 to 1,500,000 Da).

After the coated devices were formed, they were subjected to an ethylene oxide sterilization procedure. Then the amount of PEG formation was characterized. It was found that PVP K17 (7000 Da) and PVP K12 (3500 Da) were most efficient at preventing PEG formation. PVP K30 (44,000 to 54,000 Da) and PVP K90 (1,000,000 to 1,500,000 Da) did not work.

Example 3: Impact of Diffusing PVP on Coating Hardness

Coated devices were formed as described in example 1 above using (test coating) the first coating composition described above as a base coat plus the third coating composition as a top coat, and (comparison coating) a variant of the first coating composition (lacking the low-molecular weight, non-photoreactive polyvinylpyrrolidone) as a base coat, and the third coating composition as a top coat.

Figure 8:
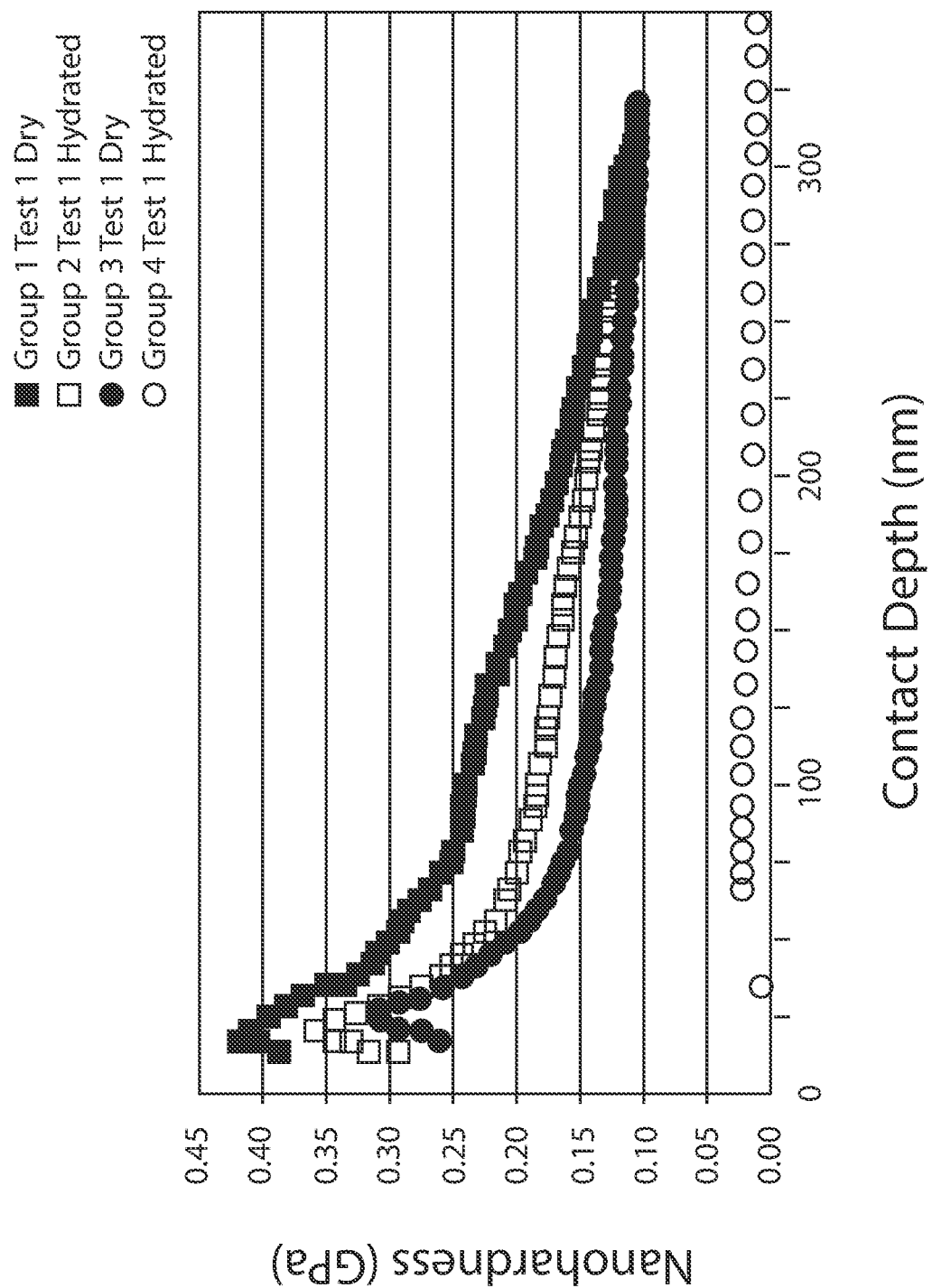
FIG. 8 is a graph showing coating hardness versus contact depth for coatings.

After the coated devices were formed, they were tested using a nano-indentation device (instrumented indentation testing—a type of indentation hardness test) on the coatings in both a dry and hydrated state. The results are shown in FIG. 8 showing coating hardness versus contact depth. This example shows that the hardness of the testing coating in a hydrated state was substantially different than the hardness of the comparison coating in a similar hydrated state. This shows an effect of low molecular weight PVP diffusing from the base coat and into the top coat.

Example 4: Effect of Basecoat Thickness on Lubricity

The effect of basecoat thickness on lubricity was investigated. A first coating composition ("base coat" formulation) was formed by mixing components together in a solvent of isopropyl alcohol and water (60/40) resulting in a composition having:
1. a photoreactive polyvinylpyrrolidone (having an average MW of about 1,450 kDa with benzophenone photoreactive groups prepared according to the methods of U.S. Pat. No. 5,637,460) (at 12 mg/ml)
2. a first non-photoreactive polyvinylpyrrolidone (PVP K90 (900,000-1,300,000 Da), at 16 mg/ml),
3. a second non-photoreactive polyvinylpyrrolidone (PVP K30 (35,000-51,000 Da), at 20 mg/ml),
4. a crosslinking compound (sodium bis(4-benzoylphenyl) phosphate—prepared according to methods of U.S. Publ. No. 2012/0046384) (at 0.8 mg/ml).

A second coating composition ("top coat" formulation) was formed by mixing components together in a solvent of isopropyl alcohol and water (15/85) at a pH sufficient for solution stability resulting in a composition having:
1. a low-molecular weight, non-photoreactive polyvinylpyrrolidone (PVP K12 (3500 Da, at 3 mg/ml), and
2. a polyacrylic acid (MW 450 kDa obtained from Sigma-Aldrich, at 5 mg/ml).

For a first test set, coated devices were formed as described in example 1 including a single basecoat and a single top coat. For a second test set, coated devices were formed as described in example 1, but including two layers of basecoat to increase the thickness of the basecoat and a single top coat (the only difference between the two test sets was the presence of one base coat layer versus two base coat layers). The thickness range of the first test set (single base coat) was approximately 2.4 µm dry and 2.4 µm to 10.0 µm wet. The wet coatings are always thicker than dry due to swelling, but the degree of swelling is dependent on various factors. The thickness range of the second test set (two base coats) was approximately 5.3 µm dry and 5.3 µm to 16.0 µm wet.

Figure 9:
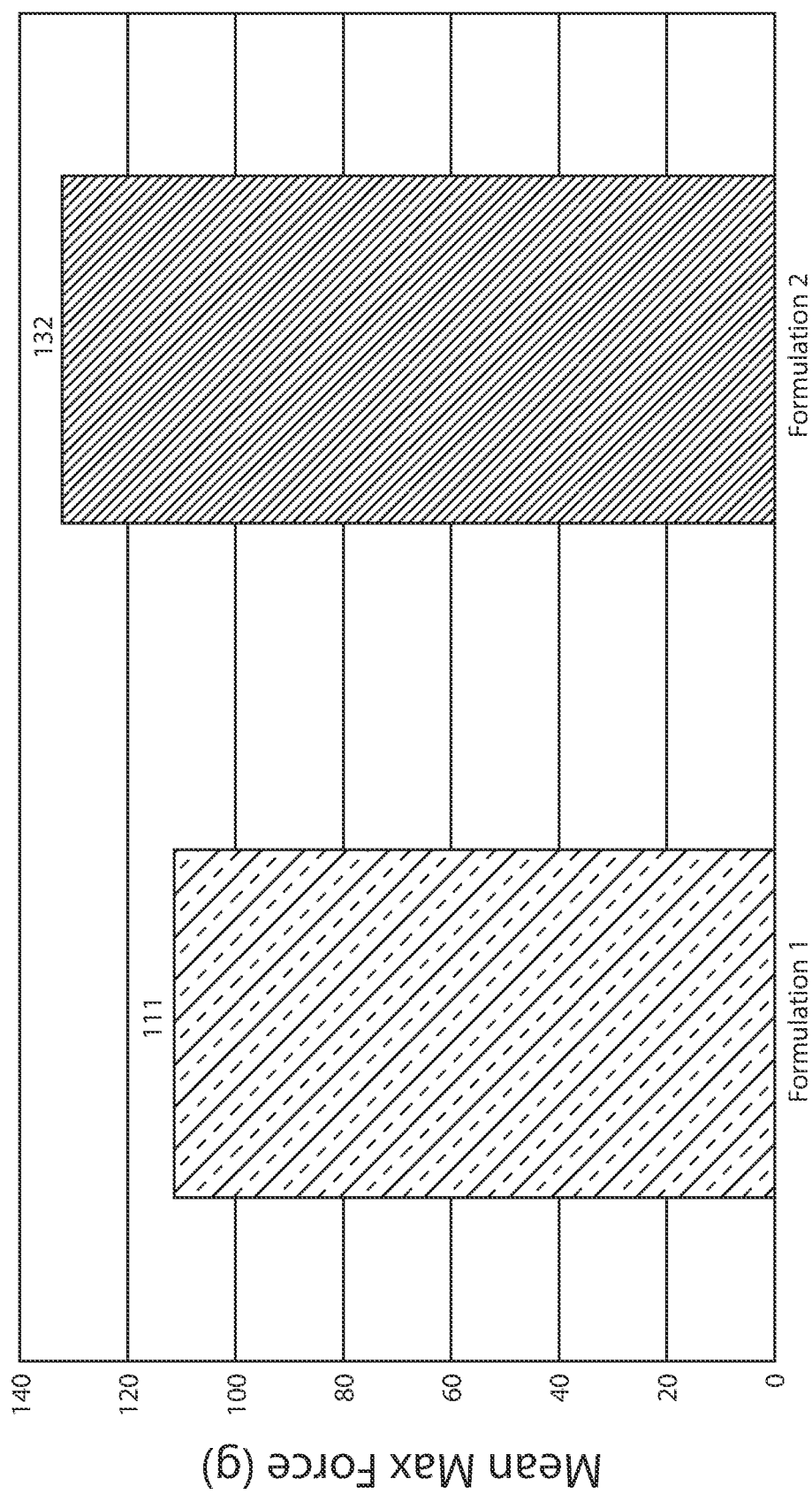
FIG. 9 is a graph showing the impact of basecoat thickness on lubricity for two different coatings.

The lubricity of the coatings was then tested for lubricity using a track test. The track test measures the force of the coated device as it traverses a tortuous anatomical model. More lubricious coatings reduce the force the device imparts on the model. The track test provides a value of force in grams (with less force meaning the coating is more lubricious). It was found that the force was 132 grams with a single basecoat layer, but fell to 111 grams with two basecoat layers. The results are also shown in FIG. 9. The results show that increases in basecoat thickness resulted in a decrease in force and thus greater lubricity.

Example 5: Effect of Crosslinker Concentration and Ratio

Figure 10:
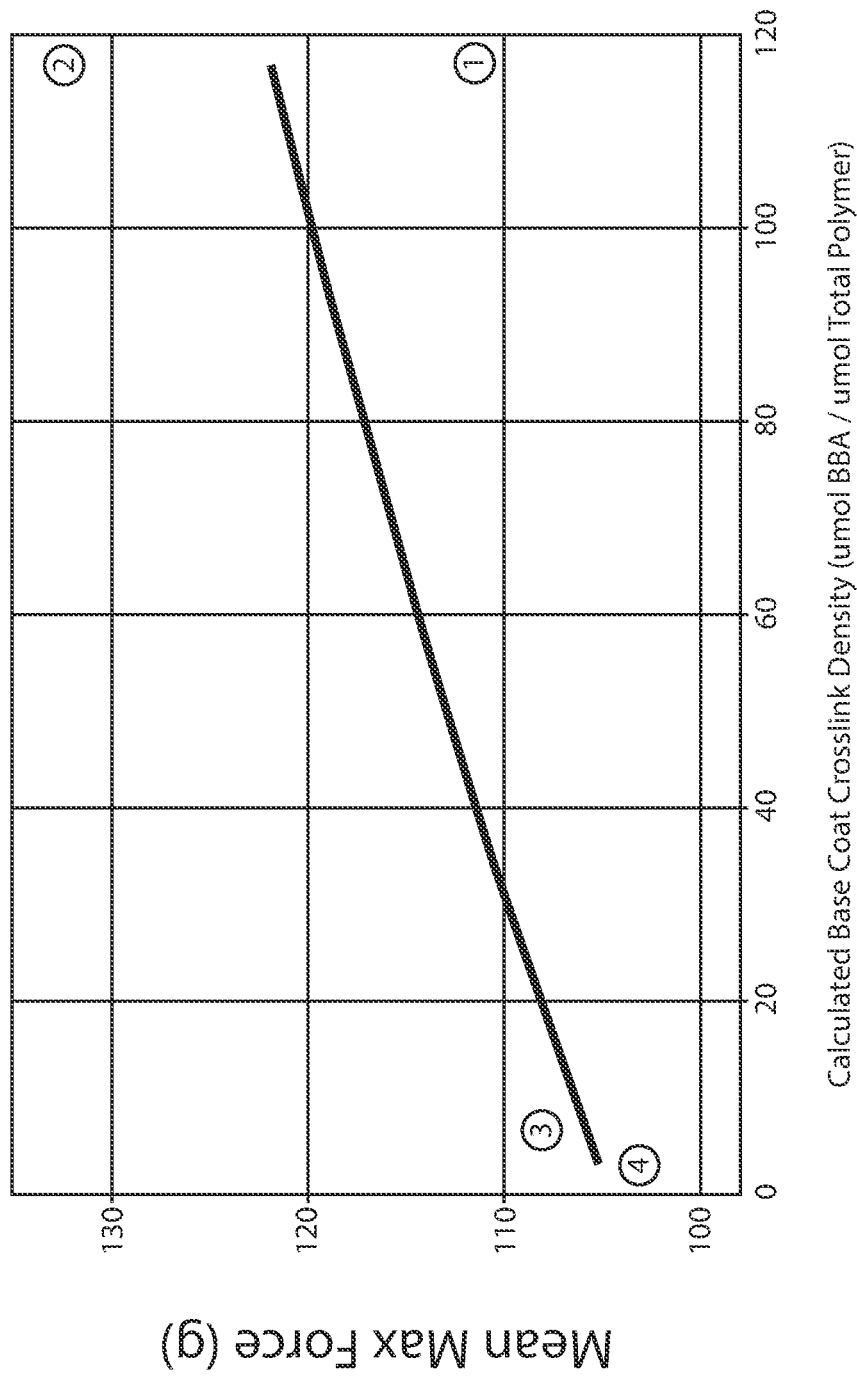
FIG. 10 is a graph showing the impact of crosslink density on lubricity for different coatings.

The two test sets of devices from Example 4 were then evaluated based on their calculated crosslink density. Crosslink density was assessed as µmols of benzoylbenzamido (BBA) groups per µmol of total polymer used. The same force-based lubricity measurements as described in Example 4 were used. The results are shown in FIG. 10, where reference 1 represents the first formulation from Example 4, reference 2 represents the second formulation from Example 4, reference 3 represents a two base coat formulation similar to reference 1, but diluted with PVP to decrease crosslink density, and reference 4 represents a different two base coat formulation with decreased crosslink density. The results show that decreased cross-link density (which impacts softness, wet modulus, and swelling ratio between dry and wet thicknesses) was correlated with decreased measured force in a track test that like used in Example 4 (e.g., greater lubricity).

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A lubricious coated medical device comprising:
a substrate; and
a first layer, wherein the first layer is disposed over the substrate, the first layer comprising
a photoreactive polyvinylpyrrolidone;
a first non-photoreactive polyvinylpyrrolidone;
a second non-photoreactive polyvinylpyrrolidone; and
a crosslinking compound;
a second layer, wherein the second layer is disposed over the first layer, the second layer comprising
a poly(acrylic acid); and
a third non-photoreactive polyvinylpyrrolidone.

2. The lubricious coated medical device of claim 1, wherein the first layer has a thickness of 100 to 4000 nm.

3. The lubricious coated medical device of claim 1, wherein the second layer has a thickness of less than 100 nm.

4. The lubricious coated medical device of claim 1, further comprising a third layer;
wherein the third layer includes the same components as the first layer; and
wherein the third layer is disposed between the first layer and the second layer.

5. The lubricious coated medical device of claim 1, further comprising a fourth layer;
wherein the fourth layer includes the same components as the second layer; and
wherein the fourth layer is disposed over the second layer.

6. The lubricious coated medical device of claim 1, the crosslinking compound comprising bis(4-benzoylpheny) phosphate of a salt thereof.

7. The lubricious coated medical device of claim 1, the crosslinking compound comprising sodium bis(4-benzoylpheny) phosphate.

8. The lubricious coated medical device of claim 1, wherein the second layer is disposed directly on the first layer.

9. The lubricious coated medical device of claim 1, the photoreactive polyvinylpyrrolidone comprising poly[vinyl pyrrolidone-co-N-(3-(4-benzoylbenzamideo) propyl) methacrylamide].

10. The lubricious coated medical device of claim 1, wherein the lubricious coated medical device is a lubricious coated coronary or peripheral vasculature medical device.

11. The lubricious coated medical device of claim 1, wherein the first non-photoreactive polyvinylpyrrolidone has an average molecular weight of 1000 kDa to 4000 kDa.

12. The lubricious coated medical device of claim 1, wherein the second non-photoreactive polyvinylpyrrolidone has an average molecular weight of 30 to 70 kDa.

13. The lubricious coated medical device of claim 1, wherein the third non-photoreactive polyvinylpyrrolidone has an average molecular weight of 3 kDa to 8 kDa.

14. A lubricious coated medical device comprising:
   a substrate; and
   a first layer, wherein the first layer is disposed over the substrate, the first layer comprising
      a photoreactive polyvinylpyrrolidone;
      a first non-photoreactive polyvinylpyrrolidone;
      a second non-photoreactive polyvinylpyrrolidone;
      a third non-photoreactive polyvinylpyrrolidone; and
      a crosslinking compound;
   a second layer, wherein the second layer is disposed over the first layer, the second layer comprising
      a poly(acrylic acid);
      a second photoreactive polyvinylpyrrolidone;
      a fourth non-photoreactive polyvinylpyrrolidone;
      a fifth non-photoreactive polyvinylpyrrolidone; and
      a second cross-linking compound.

15. The lubricious coated medical device of claim 14, wherein the first layer has a thickness of 100 to 4000 nm.

16. The lubricious coated medical device of claim 14, wherein the second layer has a thickness of less than 100 nm.

17. The lubricious coated medical device of claim 14, further comprising a third layer;
   wherein the third layer includes the same components as the first layer; and
   wherein the third layer is disposed between the first layer and the second layer.

18. The lubricious coated medical device of claim 14, further comprising a fourth layer;
   wherein the fourth layer includes the same components as the second layer; and
   wherein the fourth layer is disposed over the second layer.

19. The lubricious coated medical device of claim 14, the crosslinking compound comprising bis(4-benzoylpheny) phosphate of a salt thereof.

20. The lubricious coated medical device of claim 14, the photoreactive polyvinylpyrrolidone comprising poly[vinyl pyrrolidone-co-N-(3-(4-benzoylbenzamideo) propyl) methacrylamide].

* * * * *